US010231265B2

(12) United States Patent
Masuda et al.

(10) Patent No.: US 10,231,265 B2
(45) Date of Patent: Mar. 12, 2019

(54) WIRELESS COMMUNICATION APPARATUS, WIRELESS COMMUNICATION METHOD, WIRELESS COMMUNICATION SYSTEM, AND PROCESSOR

(71) Applicant: Sharp Kabushiki Kaisha, Osaka-shi, Osaka (JP)

(72) Inventors: Yoko Masuda, Osaka (JP); Hideo Namba, Osaka (JP); Takashi Onodera, Osaka (JP); Hiromichi Tomeba, Osaka (JP); Minoru Kubota, Osaka (JP)

(73) Assignee: /SHARP KABUSHIKI KAISHA, Sakai (JP)

( * ) Notice: Subject to any disclaimer, the term of this patent is extended or adjusted under 35 U.S.C. 154(b) by 721 days.

(21) Appl. No.: 14/405,466

(22) PCT Filed: Jun. 4, 2013

(86) PCT No.: PCT/JP2013/065424
§ 371 (c)(1),
(2) Date: Dec. 4, 2014

(87) PCT Pub. No.: WO2013/183615
PCT Pub. Date: Dec. 12, 2013

(65) Prior Publication Data
US 2015/0139106 A1 May 21, 2015

(30) Foreign Application Priority Data
Jun. 8, 2012 (JP) .................. 2012-130368

(51) Int. Cl.
*H04W 74/08* (2009.01)
(52) U.S. Cl.
CPC .............................. *H04W 74/0816* (2013.01)

(58) Field of Classification Search
CPC ................................................. H04W 74/0816
(Continued)

(56) References Cited

U.S. PATENT DOCUMENTS 8,107,993 B2    1/2012   Toshimitsu et al.
8,477,801 B2    7/2013   Sridhara et al.
(Continued)

FOREIGN PATENT DOCUMENTS

JP     2009-296374 A    12/2009
JP     2010-130625 A    6/2010
(Continued)

OTHER PUBLICATIONS

Official Communication issued in International Patent Application No. PCT/JP2013/065424, dated Jul. 9, 2013.

*Primary Examiner* — Ricky Q Ngo
*Assistant Examiner* — Ellen Kirillova
(74) *Attorney, Agent, or Firm* — Keating & Bennett, LLP

(57) ABSTRACT

MU-MIMO is implemented with little changes in the mechanism of the DCF. There is provided a wireless terminal station apparatus that is used in a wireless communication system formed of one wireless base station apparatus and a plurality of wireless terminal station apparatus, in which grouping is performed on the wireless terminal station apparatus in such a way that the wireless terminal station apparatus belongs to any one of a plurality of groups, and the wireless terminal station apparatus includes a backoff controlling portion that performs control such that a backoff value at the time of random backoff, the backoff value of the wireless terminal station apparatus belonging to at least one group, is selected from a set of candidates for a backoff value which is a set of values formed of predetermined limited numbers.

2 Claims, 24 Drawing Sheets

(58) Field of Classification Search
USPC .......................................................... 370/329
See application file for complete search history.

(56) References Cited

U.S. PATENT DOCUMENTS

| | | | |
|---|---|---|---|
| 8,705,340 B2 | 4/2014 | Gong et al. | |
| 2003/0053480 A1* | 3/2003 | Jang | H04L 12/413 |
| | | | 370/445 |
| 2006/0114878 A1* | 6/2006 | Choe | H04W 74/02 |
| | | | 370/346 |
| 2007/0165521 A1* | 7/2007 | Malik | H04L 5/06 |
| | | | 370/229 |
| 2008/0310385 A1* | 12/2008 | Iochi | H04W 28/22 |
| | | | 370/345 |
| 2009/0196273 A1* | 8/2009 | Kwon | H04W 8/30 |
| | | | 370/343 |
| 2009/0305734 A1 | 12/2009 | Toshimitsu et al. | |
| 2010/0322166 A1* | 12/2010 | Sampath | H04W 72/121 |
| | | | 370/329 |
| 2011/0141969 A1 | 6/2011 | Sridhara et al. | |
| 2011/0149723 A1 | 6/2011 | Gong et al. | |
| 2011/0268094 A1* | 11/2011 | Gong | H04L 1/1685 |
| | | | 370/338 |
| 2012/0294294 A1* | 11/2012 | Zhang | H04L 1/0025 |
| | | | 370/338 |

FOREIGN PATENT DOCUMENTS

| | | | |
|---|---|---|---|
| JP | 2011-217234 A | 10/2011 | |
| WO | 2011/084541 A1 | 7/2011 | |
| WO | 2011/087613 A2 | 7/2011 | |
| WO | WO 2011084541 A1 * | 7/2011 | ........ H04W 74/0833 |
| WO | WO 2012148478 A1 * | 11/2012 | ........... H04B 7/0452 |

* cited by examiner

FIG. 4
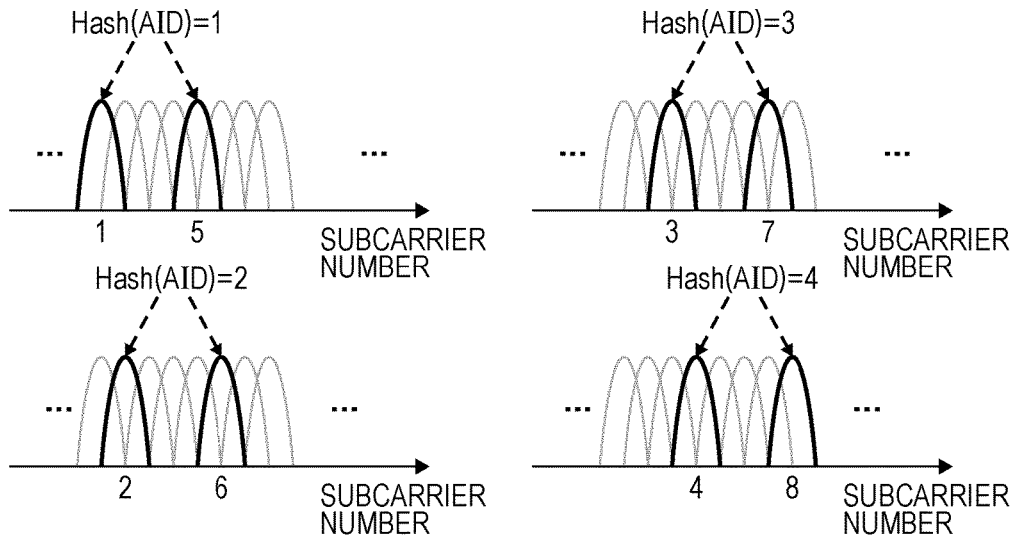
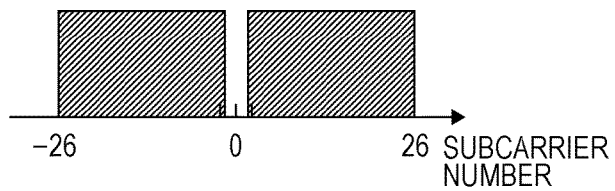

WIRELESS COMMUNICATION APPARATUS, WIRELESS COMMUNICATION METHOD, WIRELESS COMMUNICATION SYSTEM, AND PROCESSOR

TECHNICAL FIELD

The present invention relates to a wireless communication technology.

BACKGROUND ART

In IEEE802.11 standards, access control is performed such that a plurality of terminals can share the same frequency. As an example of the access control, carrier sense multiple access with collision avoidance (CSMA/CA) is adopted. CSMA/CA is a scheme in which, after each wireless terminal station which is about to transmit a frame performs carrier sense (check the state of a wireless channel) in advance, the wireless terminal station starts transmission by using control called random backoff control by which a collision between transmit data is avoided. The random backoff control is control by which a wireless terminal station that holds transmit data performs carrier sense and, after a channel used for data transmission enters an idle state for a distributed coordination function inter frame space (DIFS) period, the wireless terminal station generates random numbers in a specified contention window (CW) range and determines a random backoff time based on the random numbers.

Moreover, if transmit timing of one wireless terminal station collides with that of another wireless terminal station, the CW range is further broadened and retransmission is performed, whereby a collision of transmit timing is avoided. In the IEEE802.11a standards, the CW size can be increased in six stages from 15 to 1023. Furthermore, when the CW size reaches the maximum value, the CW range is not broadened and is made to remain at the maximum value until the number of retransmissions reaches a previously determined maximum number of retransmissions. If retransmission is unsuccessfully performed even when the number of retransmissions exceeds the maximum number of retransmissions, the transmit frame is discarded.

A model expected by the existing IEEE802.11 standards is a model in which, in uplink communication, one node repeatedly performs transmission to an access point (AP) in sequence. Therefore, in the IEEE802.11 standards, in order to prevent a plurality of terminals from performing transmission to the AP at the same time and causing a collision, a technology called the distributed coordination function (DCF) using CSMA/CA described above is adopted. In the DCF technology, a wireless terminal station that holds transmit data sends request to send (RTS) to the AP and the AP sends clear to send (CTS) to the wireless terminal station in response to that, whereby a collision of transmit data which may occur due to a hidden terminal is avoided. This stream of processing is called RTS/CTS exchange, and RTS/CTS exchange is performed based on dot11RTSThreshold. The RTS/CTS exchange is not performed when a frame which is shorter than dot11RTSThreshold is transmitted.

As described above, in the IEEE802.11 standards, the DCF technology by which a collision of the transmit timing of wireless terminals is minimized is adopted.

Moreover, recently, in uplink communication, the multi user-multi input multi output (MU-MIMO) technology by which a plurality of terminals transmit data at the same time by using the same channel has been studied. In the MU-MIMO technology, what is important is that a plurality of terminals transmit data with the same data transmit timing and the same frequency band is used.

In a technology described in PTL 1 described below, MU-MIMO is implemented by a shape expanding the DCF (by performing additional RTS/CTS exchange).

Moreover, in a technology described in PTL 2 described below, concurrent transmission is implemented by control of a backoff value.

CITATION LIST

Patent Literature

PTL 1: Japanese Unexamined Patent Application Publication No. 2010-130625
PTL 2: Japanese Unexamined Patent Application Publication No. 2011-217234

SUMMARY OF INVENTION

Technical Problem

In PTL 1, even when a transmit packet length is short, the throughput is undesirably degraded due to RTS/CTS exchange. Moreover, a base station has to specify transmit timing.

Moreover, in PTL 2, since a backoff value is allocated to all the combinations of terminals that perform transmission at the same time, depending on the combination, the backoff value undesirably becomes a long one. Furthermore, a transmit terminal has to hold a table of backoff values for all the combinations.

When an attempt to implement the MU-MIMO technology in uplink communication is made, if the current DCF is adopted, a plurality of terminals do not perform transmission at the same time, which is a problem.

An object of the present invention is to implement MU-MIMO with little change in the mechanism of the DCF. Moreover, another object is to make it possible to specify transmit timing on the terminal side.

Solution to Problem

According to an aspect of the present invention, there is provided a wireless terminal station apparatus that is used in a wireless communication system formed of one wireless base station and a plurality of wireless terminal stations, wherein grouping is performed on the wireless terminal station apparatus in such a way that the wireless terminal station apparatus belongs to any one of a plurality of groups, and the wireless terminal station apparatus includes a backoff controlling portion that performs control such that a backoff value at the time of random backoff, the backoff value of the wireless terminal station apparatus belonging to at least one group, is selected from a set of candidates for a backoff value which is a set of values formed of predetermined limited numbers.

As described above, by controlling the set of candidates for a backoff value, it is possible to reduce changes of a protocol from an existing scheme and, at the same time, perform communication with the plurality of wireless terminal stations.

As the set of candidates for a backoff value, a set of values formed of the predetermined limited numbers, the values selected from consecutive values from a backoff value candidate range based on the number of retransmissions of transmit data of the wireless terminal station to 0, may be used, or, as the set of candidates for a backoff value, a set of consecutive integers from 0, the set formed of the predetermined limited numbers, may be used. Moreover, as the set of candidates for a backoff value, a set formed of the predetermined limited numbers, the set using a predetermined value as an expected value of the set, may be used, or, as the set of candidates for a backoff value, a set determined by using a control variable notified from the wireless base station or a set notified from the wireless base station may be used.

The group to which the wireless terminal station apparatus belongs may be determined based on a frame length of transmit data held by the wireless terminal station apparatus.

Moreover, in the case of suspension of counting down from the backoff value, if the backoff value in a suspended state is a value which is not included in the set of candidates for a backoff value, correction may be made to change the backoff value to a value which is included in the set of candidates for a backoff value.

Furthermore, the present invention is a wireless base station apparatus that is used in a wireless communication system formed of one wireless base station and a plurality of wireless terminal stations, wherein grouping is performed on the wireless terminal stations in such a way that each wireless terminal station belongs to any one of a plurality of groups, and the wireless base station apparatus includes a controlling random backoff variable determining portion that determines a control variable for controlling the number of values included in a set of candidates for a backoff value which are candidates for a backoff value which is selected by the wireless terminal station apparatus belonging to at least one group, the control variable which is used in the system.

The controlling random backoff variable determining portion can determine the control variable based on a value of at least one of the number of wireless terminal station apparatuses accommodated in the wireless base station apparatus and the number of antennas of the wireless base station apparatus.

Moreover, a random backoff value candidate set generating portion that determines, as the set of candidates for a backoff value, what is obtained by selecting, from values from a backoff value candidate range based on the number of retransmissions of transmit data of the wireless terminal station to 0, values corresponding to the number of values included in the backoff value may be further provided.

In the case of generation of sets of candidates for a backoff value of a plurality of groups, the random backoff value set generating portion may perform control such that different values are included in the sets of candidates for a backoff value.

The backoff value candidate set generating portion can set an expected value of a value included in the set of candidates for a random backoff value at a predetermined value.

The wireless terminal station apparatus may be notified of at least one of the control variable and the set of candidates for a backoff value at every update.

According to another aspect of the present invention, there is provided a wireless communication method in a wireless terminal station apparatus that is used in a wireless communication system formed of one wireless base station and a plurality of wireless terminal stations, wherein grouping is performed on the wireless terminal station apparatus in such a way that the wireless terminal station apparatus belongs to any one of a plurality of groups, and the wireless communication method includes a step of performing control such that a backoff value at the time of random backoff, the backoff value of the wireless terminal station apparatus belonging to at least one group, is selected from a set of candidates for a backoff value which is a set of values formed of predetermined limited numbers.

Moreover, the present invention is a processor that makes a wireless terminal station apparatus perform a predetermined function, the wireless terminal station apparatus that is used in a wireless communication system formed of one wireless base station and a plurality of wireless terminal stations, wherein grouping is performed on the wireless terminal station apparatus in such a way that the wireless terminal station apparatus belongs to any one of a plurality of groups, and the wireless terminal station apparatus is made to perform a control function of selecting a backoff value at the time of random backoff, the backoff value of the wireless terminal station apparatus belonging to at least one group, from a set of candidates for a backoff value which is a set of values formed of predetermined limited numbers.

Furthermore, the present invention is a wireless communication method in a wireless base station apparatus that is used in a wireless communication system formed of one wireless base station and a plurality of wireless terminal stations, wherein grouping is performed on the wireless terminal stations in such a way that each wireless terminal station belongs to any one of a plurality of groups, and the wireless communication method includes a step of determining a control variable for controlling the number of values included in a set of candidates for a backoff value which are candidates for a backoff value which is selected by the wireless terminal station apparatus belonging to at least one group, the control variable which is used in the system.

In addition, the present invention is a processor that makes a wireless base station apparatus perform a predetermined function, the wireless base station apparatus that is used in a wireless communication system formed of one wireless base station and a plurality of wireless terminal stations, wherein grouping is performed on the wireless terminal stations in such a way that each wireless terminal station belongs to any one of a plurality of groups, and the wireless base station apparatus is made to perform a function of determining a control variable for controlling the number of values included in a set of candidates for a backoff value which are candidates for a backoff value which is selected by the wireless terminal station apparatus belonging to at least one group, the control variable which is used in the system.

Moreover, the present invention may be a wireless communication system formed of one wireless base station and a plurality of wireless terminal stations, wherein grouping is performed on the wireless terminal station apparatus in such a way that the wireless terminal station apparatus belongs to any one of a plurality of groups, and the wireless communication system includes: a wireless terminal station apparatus that includes a backoff controlling portion performing control such that a backoff value at the time of random backoff, the backoff value of the wireless terminal station apparatus belonging to at least one group, is selected from a set of candidates for a backoff value which is a set of values formed of predetermined limited numbers; and a wireless base station apparatus that includes a controlling random backoff variable determining portion determining a control variable for controlling the number of values included in the set of candidates for a backoff value, the control variable which is used in the system.

Advantageous Effects of Invention

By controlling a set of candidates for a backoff value, it is possible to reduce changes of a protocol from an existing scheme and, at the same time, perform communication with a plurality of wireless terminal stations. Moreover, it is possible to determine transmit timing on the wireless terminal station side.

BRIEF DESCRIPTION OF DRAWINGS

FIG. 4 is a diagram explaining processing to allocate a resource for transmitting preamble of a terminal.

DESCRIPTION OF EMBODIMENTS

First Embodiment

Hereinafter, a wireless communication technology according to an embodiment of the present invention will be described in detail with reference to the drawings. Incidentally, in the following description, unless otherwise specified, the premise is that the description is basically based on IEEE802.11 standards and IEEE802.11a standards.

Figure 1:
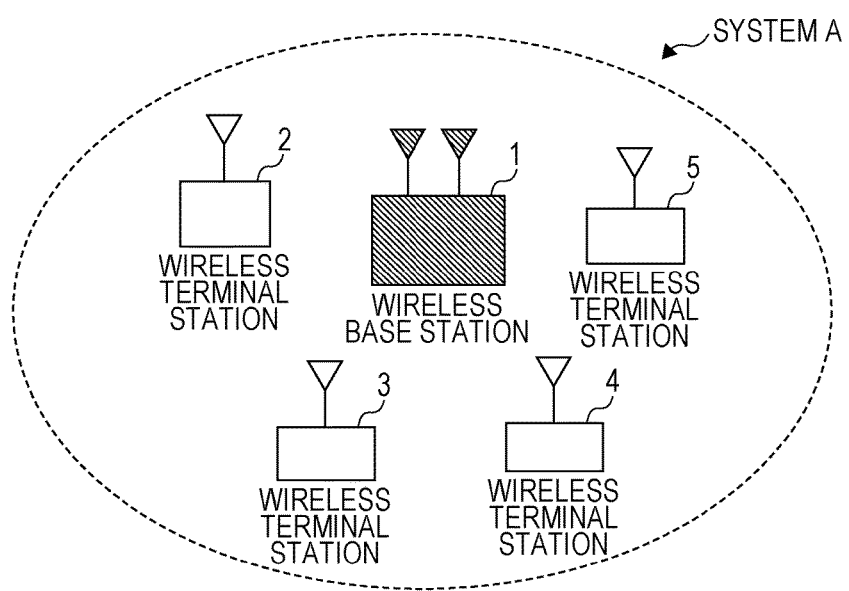
FIG. 1 is a functional block diagram depicting a schematic configuration example of a wireless communication system according to an embodiment of the present invention.

FIG. 1 is a functional block diagram depicting a schematic configuration example of a wireless communication system according to an embodiment of the present invention.

As depicted in FIG. 1, a wireless communication system A according to this embodiment includes a wireless base station 1 and wireless terminal stations 2 to 5. It is assumed that the communication stations 1 to 5 accommodate all the communication stations in their respective communication ranges. The wireless communication system A depicted in FIG. 1 is formed of the wireless base station 1, for example, which is an access point (AP) and the wireless terminal stations 2 to 5 with the same transmit frequency. Moreover, the wireless base station 1 has a plurality of antennas, and the wireless terminal stations 2 to 5 each have one antenna. Incidentally, in all the embodiments of the present invention, to simplify an explanation, it is assumed that the wireless terminal stations 2 to 5 each have one antenna, but each of the wireless terminal stations 2 to 5 may have a plurality of antennas. Likewise, it is also possible to change the number of antennas of the wireless base station 1. Moreover, in this embodiment, unless otherwise specified, it is assumed that a transmit frame length is shorter than dot11RTSThreshold in IEEE802.11 and RTS/CTS exchange is not performed.

Figure 2:
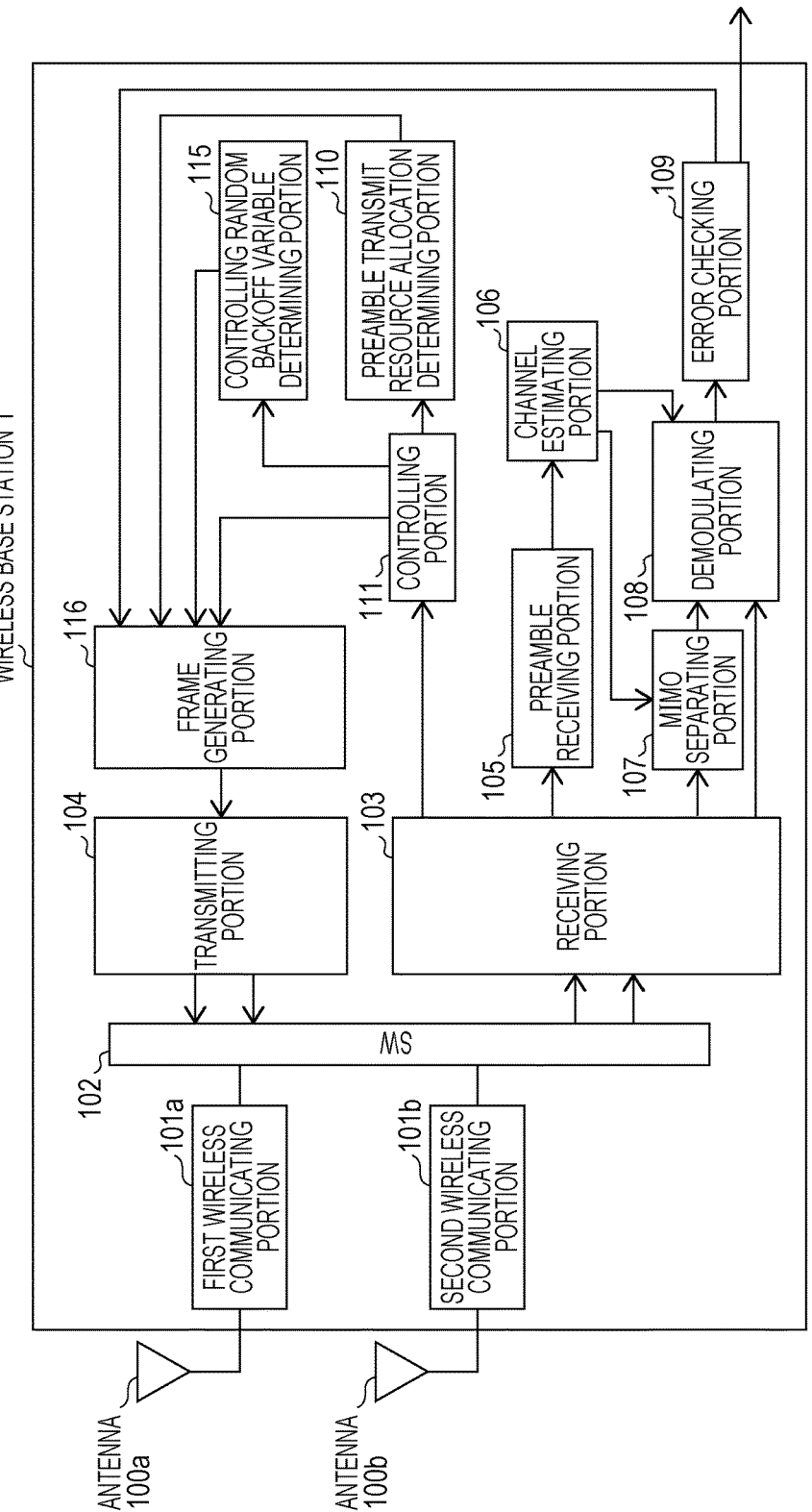
FIG. 2 is a functional block diagram depicting a configuration example of a wireless base station 1 according to a first embodiment of the present invention.

FIG. 2 is a functional block diagram depicting a configuration example of the wireless base station 1 according to a first embodiment of the present invention. The wireless base station 1 depicted in FIG. 2 includes two antennas 100a and 100b, two of first wireless communicating portion 101a and second wireless communication station 101b, corresponding to the antennas, a switch (SW) 102, a transmitting portion 104, a frame generating portion 116, a controlling portion 111, a resource for transmitting preamble allocation determining portion 110, a controlling random backoff variable determining portion 115, a preamble receiving portion 105, a channel estimating portion 106, an MIMO demodulating portion 107, a demodulating portion 108, and an error checking portion 109. The controlling portion 111 controls, based on a received signal, generation of a transmit frame, configuration of a controlling random backoff variable, and allocation of a resource for transmitting preamble. Here, an example of a method for determining allocation of a resource for transmitting preamble will be described below.

In this embodiment, it is assumed that a resource for transmitting preamble is allocated to each of the number of terminals accommodated in the wireless base station 1.

Figure 3:
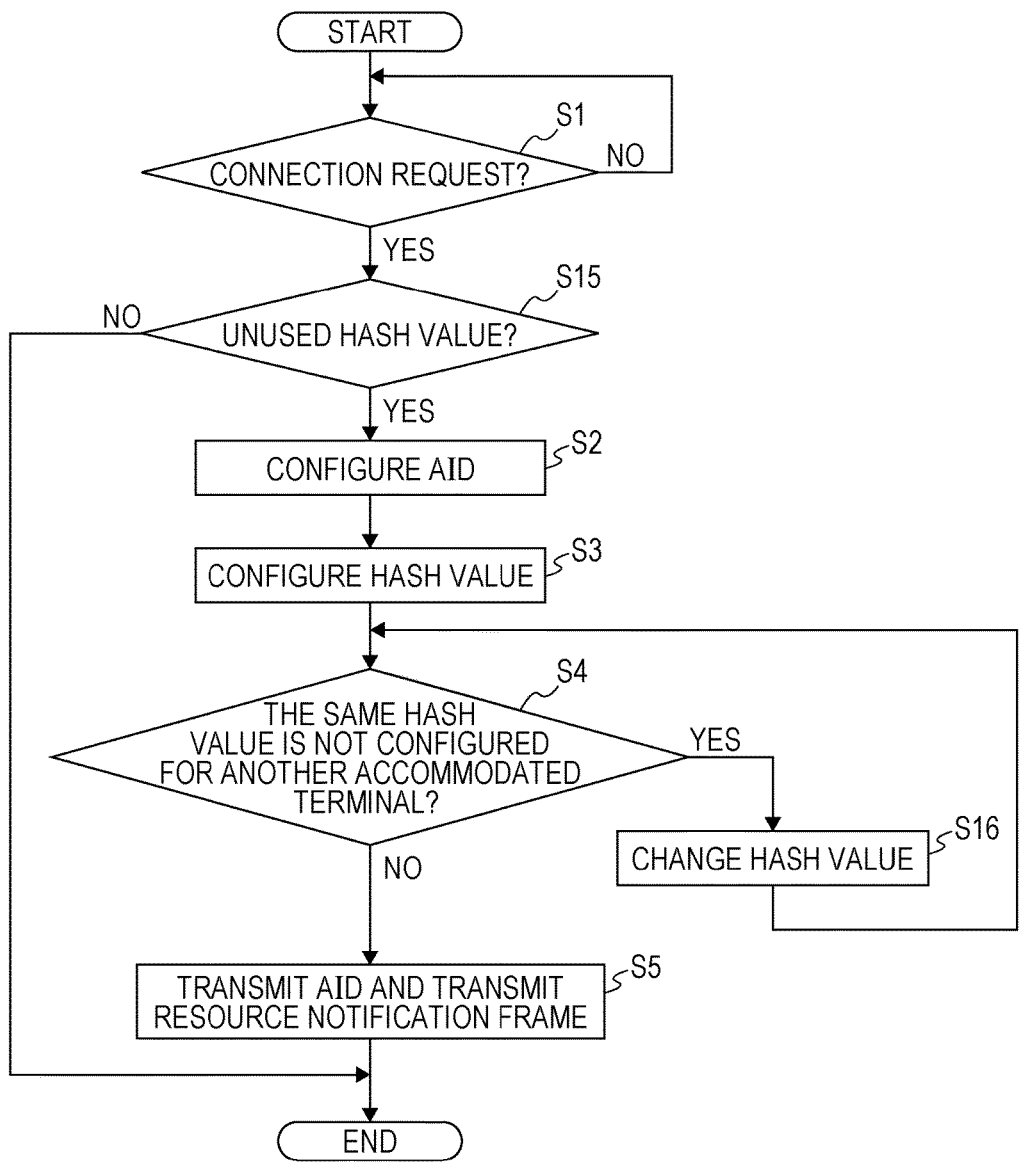
FIG. 3 is a flowchart diagram depicting the flow of association establishment processing which is performed from when the wireless base station receives a connection request till when a notification of an association ID (AID) and a resource for transmitting preamble is made.

FIG. 3 is a flowchart diagram depicting the flow of association establishment processing which is performed from when the wireless base station 1 receives a connection request till when a notification of an association ID (AID) and a resource of transmitting preamble is made. In the IEEE802.11 standards, a scheme in which, at the time of establishment of association of the wireless terminal station and the wireless base station, the wireless base station performs allocation of an AID to each wireless terminal station based on a MAC address as one of parameters is adopted. The AID is allocated in the range from 1 to 2007. In the flowchart depicted in FIG. 3, first, the wireless base station 1 is on standby until the wireless base station 1 receives a connection request by the antenna 100a or the antenna 100b (step S1). If the wireless base station 1 receives a connection request by the antenna 100a or the antenna 100b (YES), a connection request signal including a MAC address of the terminal which has performed transmission is input to the controlling portion 111 via the wireless communicating portion 101a or 101b, the switch 102, and the receiving portion 103. In the controlling portion 111, if all the hash values are used, the controlling portion 111 determines that it is impossible to establish connection to the wireless base station (step S15). If there is an unused hash value, in the controlling portion 111, allocation of an AID of the terminal that has transmitted the connection request is performed (step S2). In this embodiment, processing that follows is a part which is particularly different from that of the existing processing. The AID configured in the controlling portion 111 is mapped by a hash function (step S3). It is assumed that, as this hash value, 1 to a limit number are allocated. In this embodiment, this limit number is set at 4, and mapping is performed on values 1 to 4. An example of the hash function is depicted below.

[Math. 1]

$$\text{Hash}(AID) = \begin{cases} 1 & (AID = 1 \text{ to } 502) \\ 2 & (AID = 503 \text{ to } 1004) \\ 3 & (AID = 1004 \text{ to } 1506) \\ 4 & (AID = 1506 \text{ to } 2007) \end{cases} \quad \text{(Equation 1)}$$

It is checked whether or not the configured hash value is already configured for another accommodated terminal (step S4); if the configured hash value is not configured for another terminal (NO), an AID and a resource for transmitting preamble are transmitted to the terminal which has made the connection request (step S5). Moreover, if the same hash is already used for an accommodated terminal in step S4 (YES), 1 is added to the current hash value or the current hash value is changed to 1 if the current hash value is the maximum value (step S16)) and check is made again in step S4. Since connection is disabled in step S15 if all the hash values are used, the terminal performing step S4 can allocate any one of hash values 1 to 4.

FIG. 4 is a diagram explaining processing to allocate a resource for transmitting preamble of a terminal.

As allocation of a resource for transmitting preamble, in this embodiment, as depicted in FIG. 4(a), an OFDM subcarrier number is allocated to each hash value once every four hash values. By changing the number to be allocated by 1 for each hash value, it is possible to prevent overlapping of the resource for transmitting preamble of a terminal having each hash value. In IEEE802.11a, since OFDM subcarriers are as depicted in FIG. 4(b), there are 52 subcarriers in total. In this embodiment, the subcarriers are allocated to hash values mapped to 4 values. A channel estimation method is indicated in the following equation. First, a previously determined preamble A is expressed in the following equation.

[Math. 2]

$$A = a + jb \quad \text{(Equation 2)}$$

Likewise, a signal $R_i$ received from a wireless terminal station i is expressed in the following equation.

[Math. 3]

$$R_i = p_i + jq_i \quad \text{(Equation 3)}$$

Based on equation 2 and equation 3, channel information $H_i$ of the wireless terminal station i can be expressed in the following equation.

[Math. 4]

$$H_i = \frac{R_i}{A} \quad \text{(Equation 4)}$$

When channel estimation is performed based on the preamble, a frequency to which no transmit resource is allocated is interpolated by using the sinc function or the like.

Figure 5:
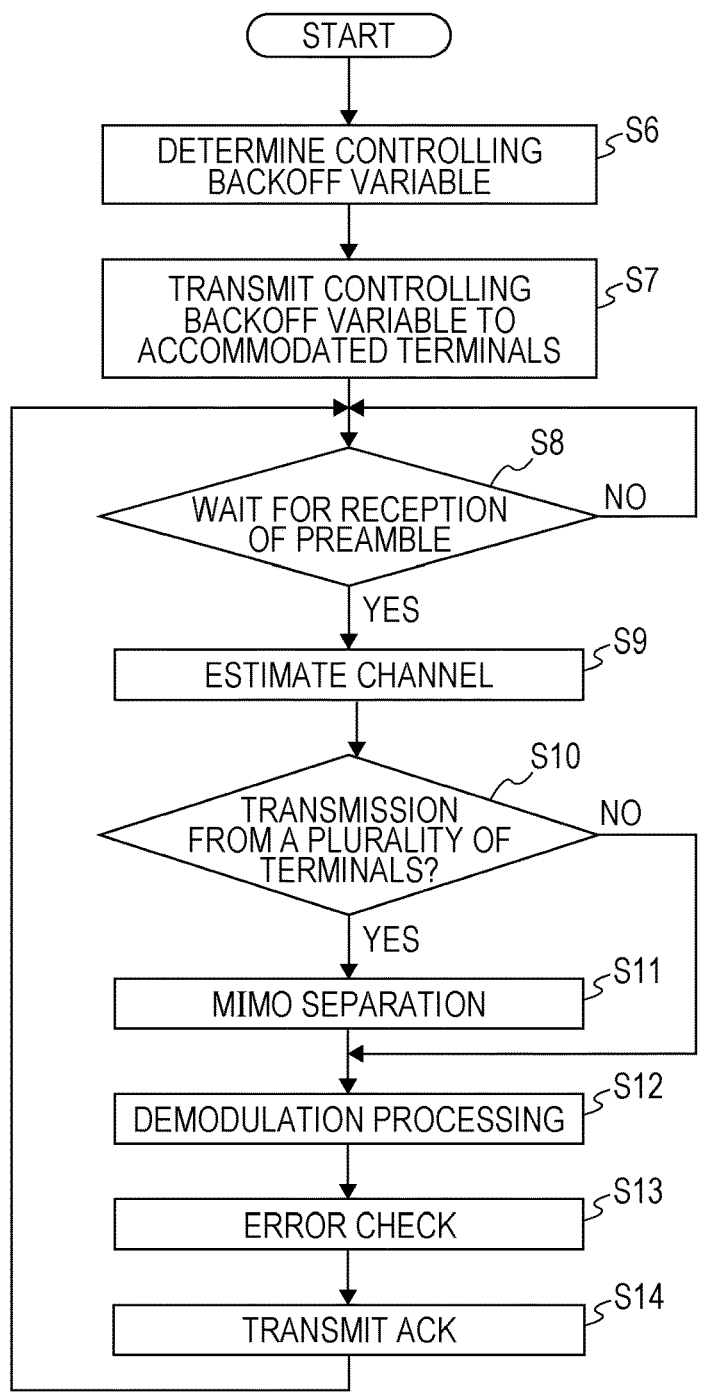
FIG. 5 is a flowchart diagram depicting the flow of operation of each element of FIG. 2.

FIG. 5 is a flowchart diagram depicting the flow of operation of each element of FIG. 2.

The wireless base station 1 checks the number of accommodated terminals and the number of antennas of the wireless base station on a regular basis and determines a controlling random backoff variable (step S6). The controlling backoff variable thus determined is input to the frame generating portion 116 and is transmitted to the wireless terminal stations 2 to 5 which are accommodated terminals of the wireless base station 1 via the transmitting portion 104, the switch 102, the wireless communicating portion 101a or 101b, and the antenna 100a or 100b (step S7).

The wireless base station 1 waits for reception of a preamble (step S8). When receiving a preamble, the wireless base station 1 inputs the preamble to the preamble receiving portion 105, from the two antennas 100a and 100b, via the respective wireless communicating portions 101a and 101b, the switch 102, and the receiving portion 103. In the channel estimating portion 106, based on the received preamble, a channel is estimated (step S9).

Moreover, in the preamble receiving portion 105, the transmit resource of the received signal is checked. By checking the resource which has been actually transmitted against the allocated transmit resource, it is possible to determine the number of terminals that have transmitted the preamble. In the preamble receiving portion 105, it is determined whether or not the received signal has been received from a plurality of terminals (step S10). If the signal from the plurality of terminals has been received, MIMO separation is performed in the MIMO separating portion 107 to obtain the signals from the terminals by using a channel estimation value (step S11), and, in the demodulating portion 108, demodulation is performed (step S12). If transmission has not been performed from the plurality of terminals in step S10, demodulation is performed in the demodulation processing portion 108 (step S12).

On the signal demodulated in the demodulating portion 108, error check is performed in the error checking portion 109 (step S13), and the presence or absence of an error is input to the frame generating portion 116.

The frame generating portion 116 generates an acknowledge (ACK) frame based on the result of error check and transmits the ACK frame via the transmitting portion 104, the switch 102, one wireless communicating portion 101b, and one antenna 100b (step S14).

After transmitting the ACK frame, the wireless base station 1 starts waiting for reception of a next frame.

Figure 6:
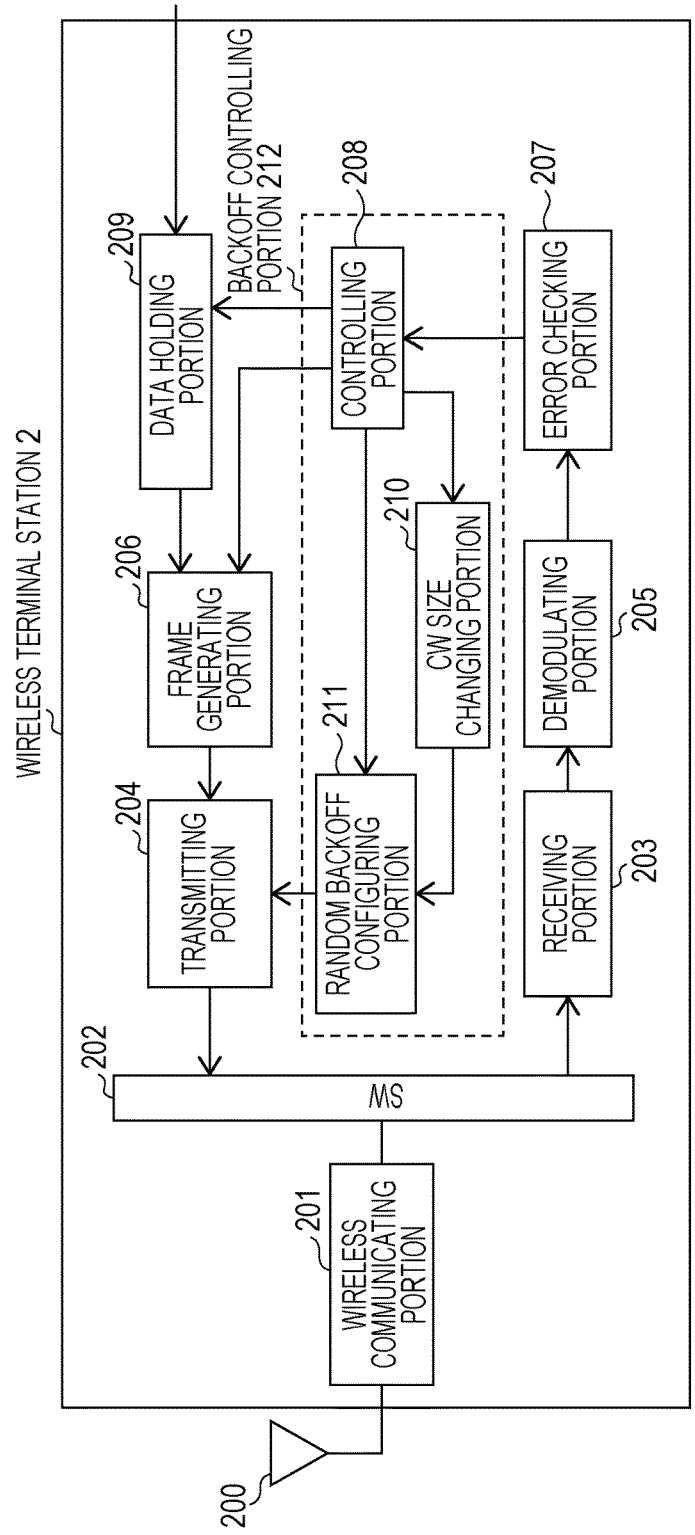
FIG. 6 is a functional block diagram depicting a configuration example of a wireless terminal station 2 according to the first embodiment of the present invention.

FIG. 6 is a functional block diagram depicting a configuration example of the wireless terminal station 2 according to the first embodiment of the present invention. As depicted in FIG. 6, the wireless terminal station 2 includes an antenna 200, a wireless communicating portion 201, a switch 202, a receiving portion 203, a transmitting portion 204, a demodulating portion 205, a frame generating portion 206, an error checking portion 207, a controlling portion 208, a data holding portion 209, a CW size changing portion 210, and a random backoff configuring portion 211. Moreover, in the drawing, the controlling portion 208, the CW size changing portion 210, and the random backoff configuring portion 211 collectively form a backoff controlling portion 212.

In existing random backoff configuration, uniform random numbers (integers) of [0, CW size] are configured, and transmission is started with timing obtained by multiplying an integer selected from the uniform random numbers by a slot time.

In the existing scheme, the CW size is set by a previously determined scheme; in this embodiment, the CW size set by the existing scheme is changed in such a way as to be reduced based on at least one of the number of terminals accommodated in the wireless base station 1 and the number of antennas of the accommodated terminal. As an example of change, there is a scheme by which what is obtained by multiplying the CW size set by the existing scheme by a controlling random backoff variable (≥1) is used as a CW size for a terminal which is intended to perform MU-MIMO. As a result, the CW size shared by the terminals which are intended to perform MU-MIMO is reduced. As an example, an example of a way to determine a controlling random backoff variable X based on the number of terminals accommodated in the wireless base station 1 is indicated by the following equation.

[Math. 5]

$$X = \frac{N}{CW_{min} \times 2} \qquad \text{(Equation 5)}$$

Here, N is the number of accommodated terminals and $CW_{min}$ is the minimum size of the CW sizes set by the existing scheme. A new CW size $CW_{MU\text{-}MIMO}$ of a terminal which is intended to perform MU-MIMO at this time is indicated in equation 6.

[Math. 6]

$$CW_{MU\text{-}MIMO} = CW \times X \qquad \text{(Equation 6)}$$

Here, CW is the CW size set by the existing scheme. In the IEEE802.11a standards, the CW size is increased in the range from 15 to 1023 every time retransmission is performed. The existing way to determine the CW size in IEE802.11a is indicated in equation 7. However, n is the number of retransmissions.

[Math. 7]

$$CW = (CW_{min}+1) \times 2^n - 1 \qquad \text{(Equation 7)}$$

As for the effect produced by the controlling random backoff variable X determined by equation 5 will be described later with reference to FIG. 10 in this embodiment.

By using flowcharts of the wireless terminal station in FIGS. 7 and 8, the operation of each element of FIG. 6 will be described.

Figure 7:
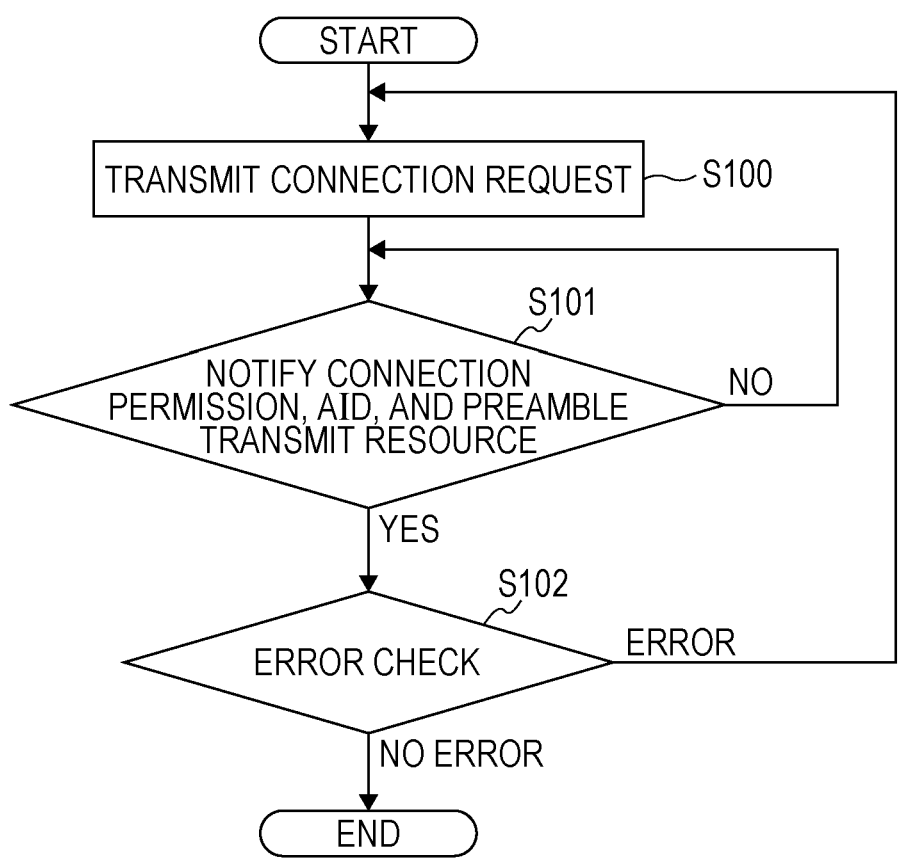
FIG. 7 is a flowchart diagram depicting the flow of processing which is performed from when the wireless terminal station makes a connection request to the wireless base station till when association is established.

FIG. 7 is a flowchart diagram depicting the flow of processing which is performed from when the wireless terminal station 2 makes a connection request to the wireless base station 1 till when association is established. The wireless terminal station 2 transmits a connection request to the wireless base station 1 (step S100) and waits for reception of a connection permission frame (including a connection permission notification, a resource for transmitting preamble, and an AID) from the wireless base station 1 (step S101). When receiving a connection permission frame by the antenna 200, the wireless terminal station 2 performs error check in the error checking portion 207 via the wireless communicating portion 201, the switch 202, the receiving portion 203, and the demodulating portion 205 (step S102). If no error is found in step S102, which indicates that connection has been successfully performed, the wireless terminal station 2 ends the processing. If an error occurs in step S102, the wireless terminal station 2 generates a connection request frame in the frame generating portion 206 and transmits a connection request again from the antenna 200 via the transmitting portion 204, the switch 202, and the wireless communication 201.

Figure 8:
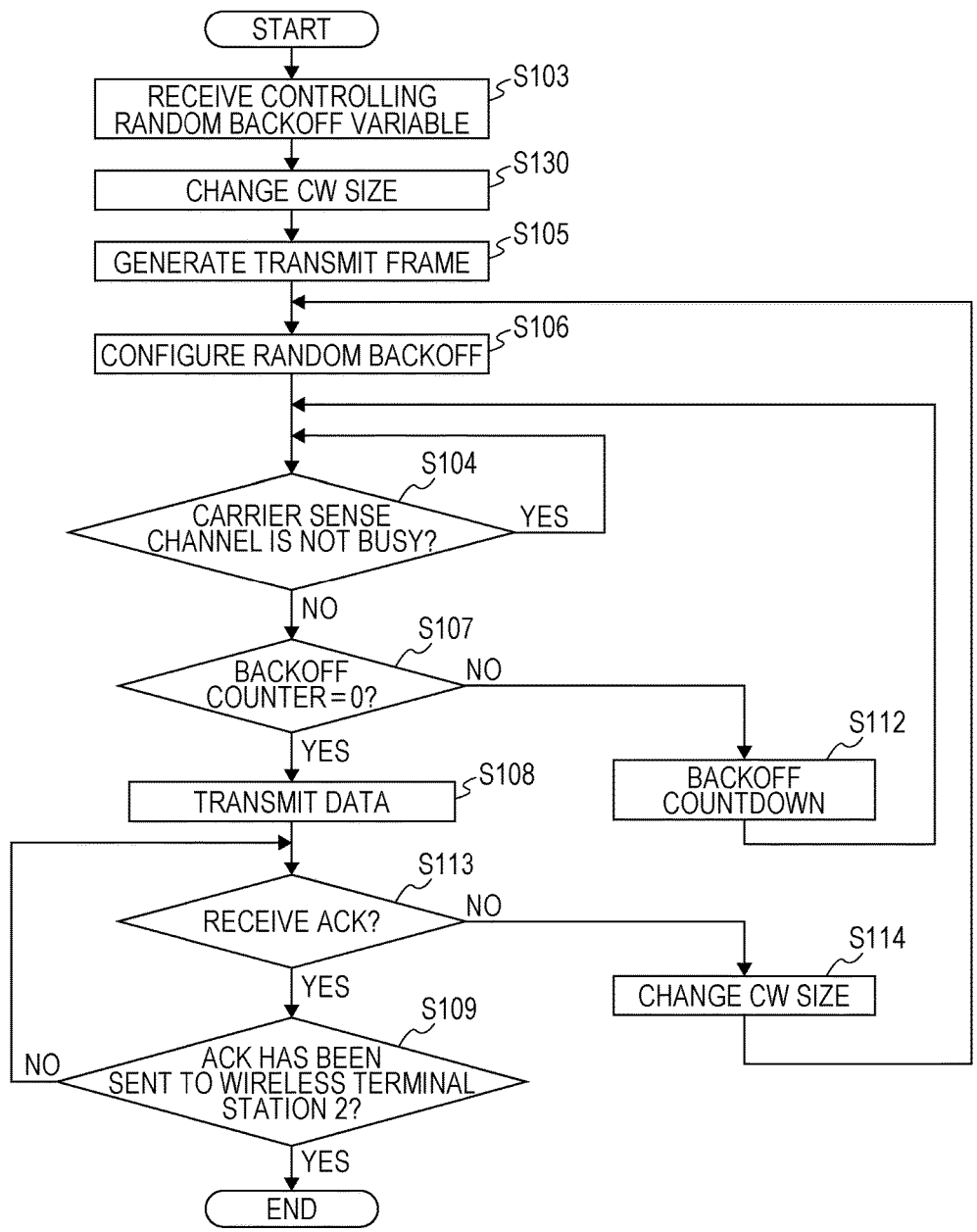
FIG. 8 is a flowchart diagram depicting the flow of processing by which data is transmitted to the wireless base station from the wireless terminal station.

FIG. 8 is a flowchart diagram depicting the flow of processing by which data is transmitted to the wireless base station 1 from the wireless terminal station 2. The wireless terminal station 2 of FIG. 6 receives a signal (a restriction signal) including a control variable of random backoff, the signal transmitted from the wireless base station 1, by the antenna 200 (step S103). The received signal is input to the error checking portion 207 via the wireless communicating portion 201, the switch 202, the receiving portion 203, and the demodulating portion 205. The signal (restriction signal) including the controlling random backoff variable, the signal input to the error checking portion 207, is subjected to error check in the error checking portion 207 and is input to the backoff controlling portion 212. The signal input to the backoff controlling portion 212 is input to the CW size changing portion 210 via the controlling portion 208. In the CW size changing portion 210, by using the notified controlling random backoff variable, control by which the CW size of the wireless terminal station 2 is changed is performed (step S130).

When transmit data is generated, the wireless terminal station 2 generates a transmit frame in the frame generating portion 206 (step S105). The generated transmit frame is input to the transmitting portion 204. In the random backoff configuring portion 211, based on the CW size changed in the CW size changing portion 210, the wireless terminal station 2 determines a backoff value by using uniform random numbers as a set of contiguous integers from 0 to the CW size (step S106). Next, the wireless terminal station 2 performs carrier sense and determines whether or not the channel is in a busy state (step S104). If the channel is busy in step S104, the wireless terminal station 2 waits until the channel enters an idle state. If the channel is not in a busy state in step S104, the wireless terminal station 2 checks whether the backoff value is 0 (step S107). If the backoff value is not 0 in step S107, the wireless terminal station 2 decrements the backoff value by 1 (step S112). After decrementing the backoff value, the wireless terminal station 2 waits for a slot time in IEEE802.11 and then performs carrier sense again and checks the channel state (step S104). If the backoff value is 0 in step S107, the wireless terminal station 2 determines that it is transmit timing and transmits the transmit frame generated in the frame generating portion 206 from the antenna 200 via the switch 202 and the wireless communicating portion 201 in the order of the preamble and the transmit data (step S108).

After the transmit data of the wireless terminal station 2 is transmitted in step S108, the wireless terminal station 2 waits until the wireless terminal station 2 receives an ACK (step S113). A terminal to which the above-described ACK has been sent becomes clear only when reception and demodulation are performed. If the wireless terminal station 2 receives an ACK in step S113, the wireless terminal station 2 checks whether the received ACK has been sent thereto (step S109). If the ACK has not been transmitted for a time corresponding to "a short inter frame space (SIFS) period+ an ACK frame length" in IEEE802.11 in step S113, it is determined that transmission has been performed unsuccessfully, and the wireless terminal station 2 changes the CW size in the CW size changing portion 210 (step S114) and configures the backoff value again in the random backoff configuring portion 211 (step S106). The method for changing the CW size conforms to the IEEE802.11 standards. If the ACK received in step S109 has been sent to the wireless terminal station 2, the processing is ended. If the received ACK has not been sent to the wireless terminal station 2, the wireless terminal station 2 waits until an ACK is received again (step S113).

Figure 9:
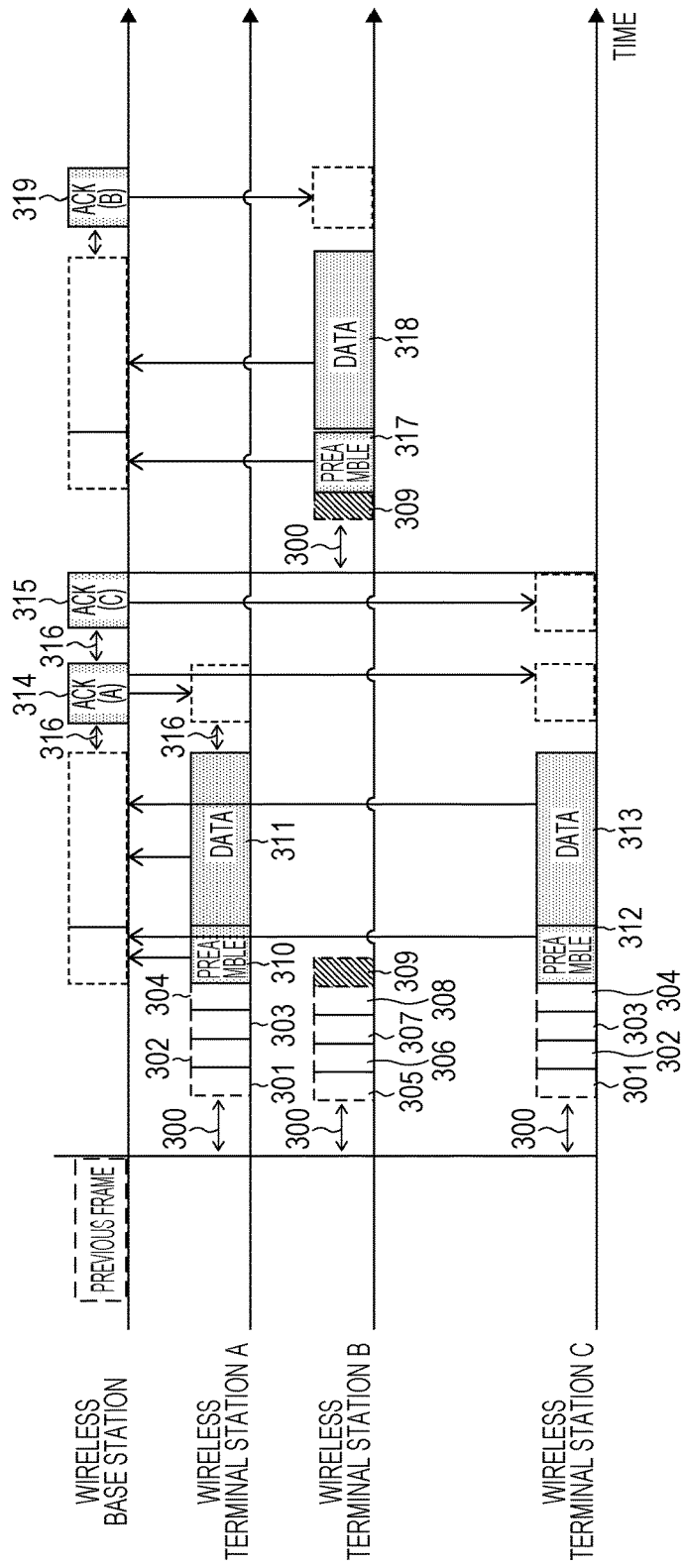
FIG. 9 is a timing diagram which is observed when the wireless terminal stations make an attempt to perform transmission to the wireless base station, overlapping of the transmit timing of the wireless transmission terminal stations occurs, and MU-MIMO transmission is performed.

FIG. 9 is a timing diagram which is observed when wireless terminal stations A to C make an attempt to perform transmission to the wireless base station, overlapping of the transmit timing of the wireless transmission terminal stations A and C occurs, and MU-MIMO transmission is performed.

The wireless terminal stations A to C wait for a given length of time after the completion of the previous frame and then start backoff. A blank period 300 at this time corresponds to the DCF inter frame space (DIFS) period of IEEE802.11. Each of blank periods 301 to 309 corresponds to the slot time in IEEE802.11. In an example of FIG. 9, since the backoff value selected by the wireless terminal stations A and C is 4 and the backoff value selected by the wireless terminal station B is 5, the wireless terminal stations A and C whose selected backoff value is small acquire a transmission right at the same time. Since two terminals transmit transmit frames to the wireless base station, MU-MIMO performed by two terminals is implemented. In this embodiment, in order to increase the probability that the backoff values selected by a plurality of terminals take the same value as just described, the CW size is limited by the controlling random backoff variable. The wireless terminal station A transmits a preamble 310 by the transmit resource allocated thereto in advance. Then, the wireless terminal station A transmits data 311 to the wireless base station in an occupied band of the wireless terminal station A. The wireless terminal station C also transmits a preamble 312 and data 313 to the wireless base station in a similar way. At this time, the occupied bands of the wireless terminal stations A and C are the same.

The wireless base station that has received the data from the two terminals at the same time transmits, to the wireless terminal stations A and C, an ACK(A) 314 for the wireless terminal station A and an ACK(C) 315 for the wireless terminal station C. A blank period 316 at this time corresponds to the short inter frame space (SIFS) period in the IEEE802.11 standards. In the timing diagram of FIG. 9, every time a plurality of ACKs are transmitted, the SIFS period is left between the ACKs; however, since the wireless terminal station performs reception operation until the ACK is received, the ACK(A) 314 and the ACK(C) 315 may be transmitted continuously without the SIFS period left between the ACK(A) 314 and the ACK(C) 315. When the wireless terminal stations A and C receive their respective ACKs, transmission and reception of data is started again. After a blank period 310, the wireless terminal station B starts again a countdown of backoff 309 corresponding to a carryover. Thereafter, when the wireless terminal station B transmits a preamble 317 and data 318 to the wireless base station and receives an ACK(B) 319 for the wireless terminal station B, the transmission from the wireless terminal station B is ended.

Figure 10:
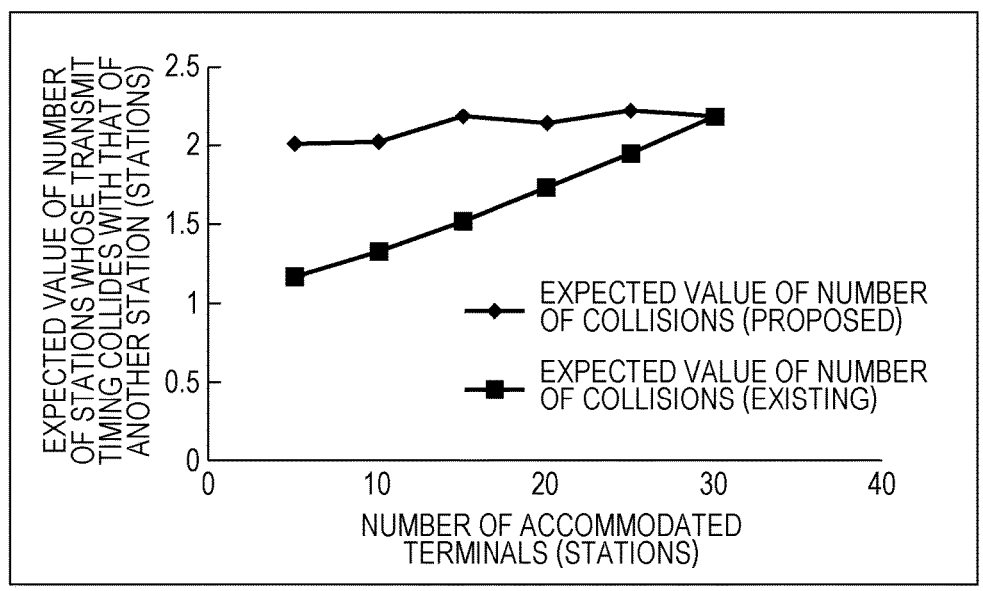
FIG. 10 is a diagram depicting expected values of the number of stations whose transmit timing collides with that of another station with respect to the number of accommodated terminal stations when a controlling random backoff variable indicated by equation (5) is used and in the existing IEEE802.11a standards.

FIG. 10 is a diagram depicting expected values of the number of stations whose transmit timing collides with that of another station with respect to the number of accommodated terminal stations when a controlling random backoff variable indicated in equation (5) is used and in the existing IEEE802.11a standards. However, in a comparison depicted in FIG. 10, since transmission is first transmission, the existing CW size and $CW_{min}$ are 15. This is the minimum value in the IEEE802.11a standards. When the uniform random numbers of [0, CW] are used for random backoff, if the number of accommodated terminals is N, an expected value E of the number of stations whose transmit timing collides with that of another station in the existing scheme is indicated as follows.

[Math. 8]

$$E = \sum_{x=1}^{N-1} \left\{ x \times NCx \left( \frac{1}{CW+1} \right)^N \sum_{i=1}^{CW} i^{N-x} \right\} + N \times \left( \frac{1}{CW+1} \right)^{N-1} \quad \text{(Equation 8)}$$

In a proposed scheme depicted in FIG. 10, CW is determined by using equation (5) and equation (6).

[Math. 9]

$$CW_{MU-MIMO} = CW * \frac{N}{CW_{min} \times 2} \quad \text{(Equation 9)}$$

Moreover, in this example, since $CW=CW_{min}$, in equation (9), $CW_{MU-MIMO}=N/2$. By substituting this $CW_{MU-MIMO}$ into CW of equation (8), the expected value E in the proposed scheme is determined.

As is clear from FIG. 10, by reducing the CW size, the probability of a collision of the transmit timing of a plurality of terminals is increased, whereby MU-MIMO in uplink communication is implemented. In the scheme described in this embodiment, since few changes are made to the existing scheme, implementation is easy. Moreover, the transmit terminal can determine the transmit timing. In this embodiment, limitations are imposed on the CW size to reduce the number of candidates for a random backoff value; however, if there is a wireless base station that performs similar control in the neighborhood, there is a possibility that a collision between transmission performed by the wireless terminal stations performing communication with the wireless base stations occurs and a communication error is generated. In such a case, as a method for reducing the number of candidates for a random backoff value, discrete values may be selected as candidates for a random backoff value such that different candidate values are used among the neighboring wireless base stations.

Second Embodiment

In this embodiment, an embodiment in which a terminal which is intended to perform MU-MIMO and a terminal that follows the existing scheme perform transmission to a common AP will be described. Also in this embodiment, unless otherwise specified, it is assumed that the description is based on the IEEE802.11 standards and the IEEE802.11a standards. Moreover, unless otherwise specified, it is assumed that a transmit frame length is shorter than dot11RTSThreshold in IEEE802.11 and RTS/CTS exchange is not performed. As described above, in this embodiment, it is possible to implement MU-MIMO with little change in the mechanism of the DCF.

Figure 11:
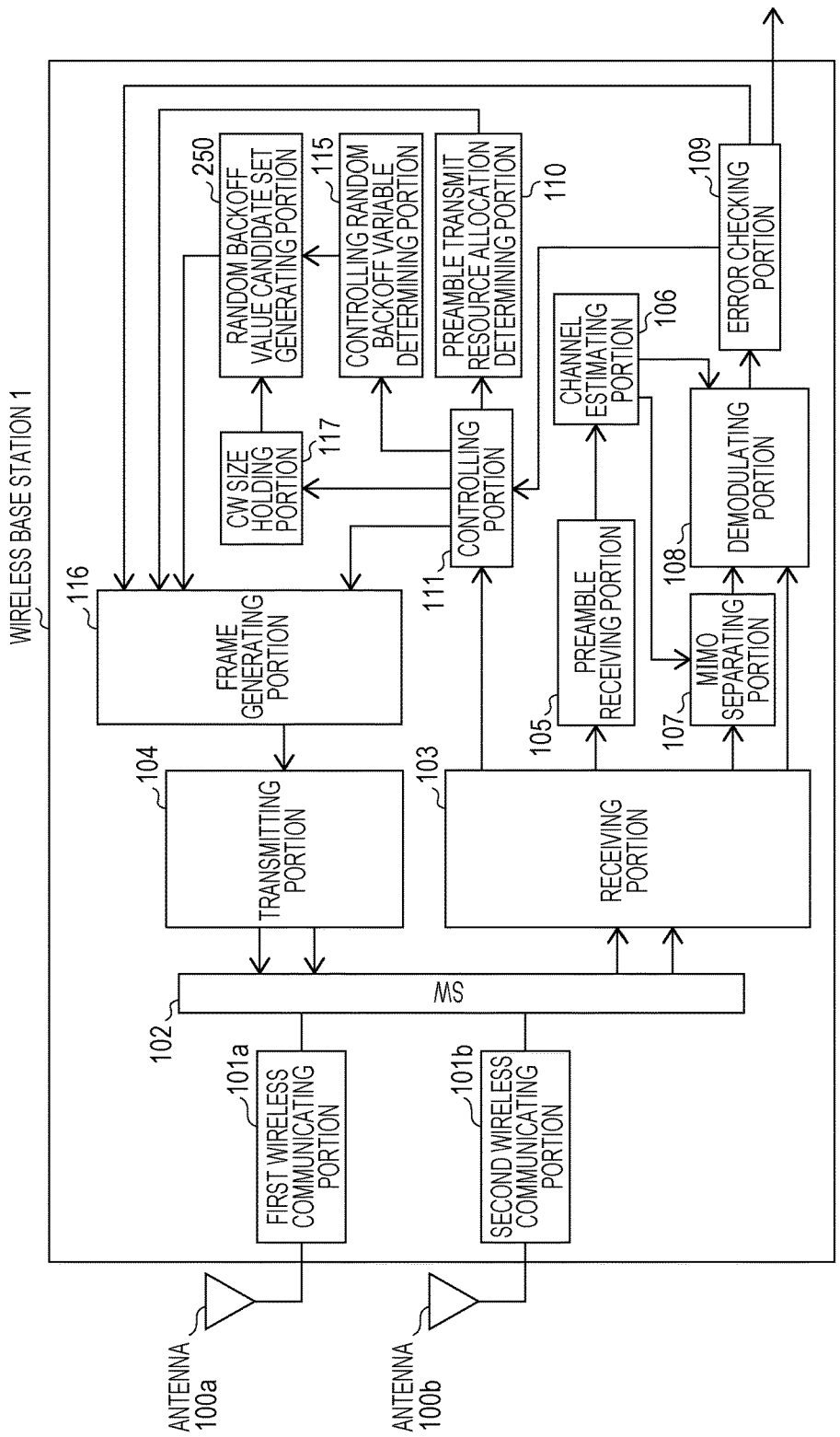
FIG. 11 is a functional block diagram depicting a configuration example of a wireless base station 1 according to a second embodiment.

In FIG. 1, an embodiment for a system model formed of a wireless base station 1, wireless terminal stations 2 and 4 which are intended to perform MU-MIMO, and other wireless terminal stations 3 and 5 will be described. FIG. 11 is a functional block diagram depicting a configuration example of the wireless base station 1 according to a second embodiment. Here, the functional block diagram of FIG. 11 has a configuration in which, between the controlling random backoff variable determining portion 115 and the frame generating portion 116 of FIG. 2, a random backoff value candidate set generating portion 250 is added and a connection from the error checking portion 109 to the controlling portion 111 is established. Moreover, between the controlling portion 111 and the random backoff value candidate set generating portion 250, a CW size holding portion 117 is added.

In this embodiment, as a result of the wireless terminal stations which are intended to perform MU-MIMO using a common set of candidates for a random backoff value determined by an AP, the probability of a transmit timing collision is increased. The set of candidates for a random backoff value here is a set of candidates for a backoff value which is selected by a terminal which is intended to perform MU-MIMO. All the integers included in the set of candidates for a random backoff value are set at uniform random numbers, and a terminal which is intended to perform MU-MIMO selects a backoff value.

A series of flows in which the wireless base station 1 receives a connection request from any one of the wireless terminal stations 2 to 5 and transmits a connection permission frame to the wireless terminal station which has transmitted the connection request is assumed to be similar to that described in the first embodiment, and the description thereof is omitted because it has been given by using FIGS. 3 and 4.

Figure 12:
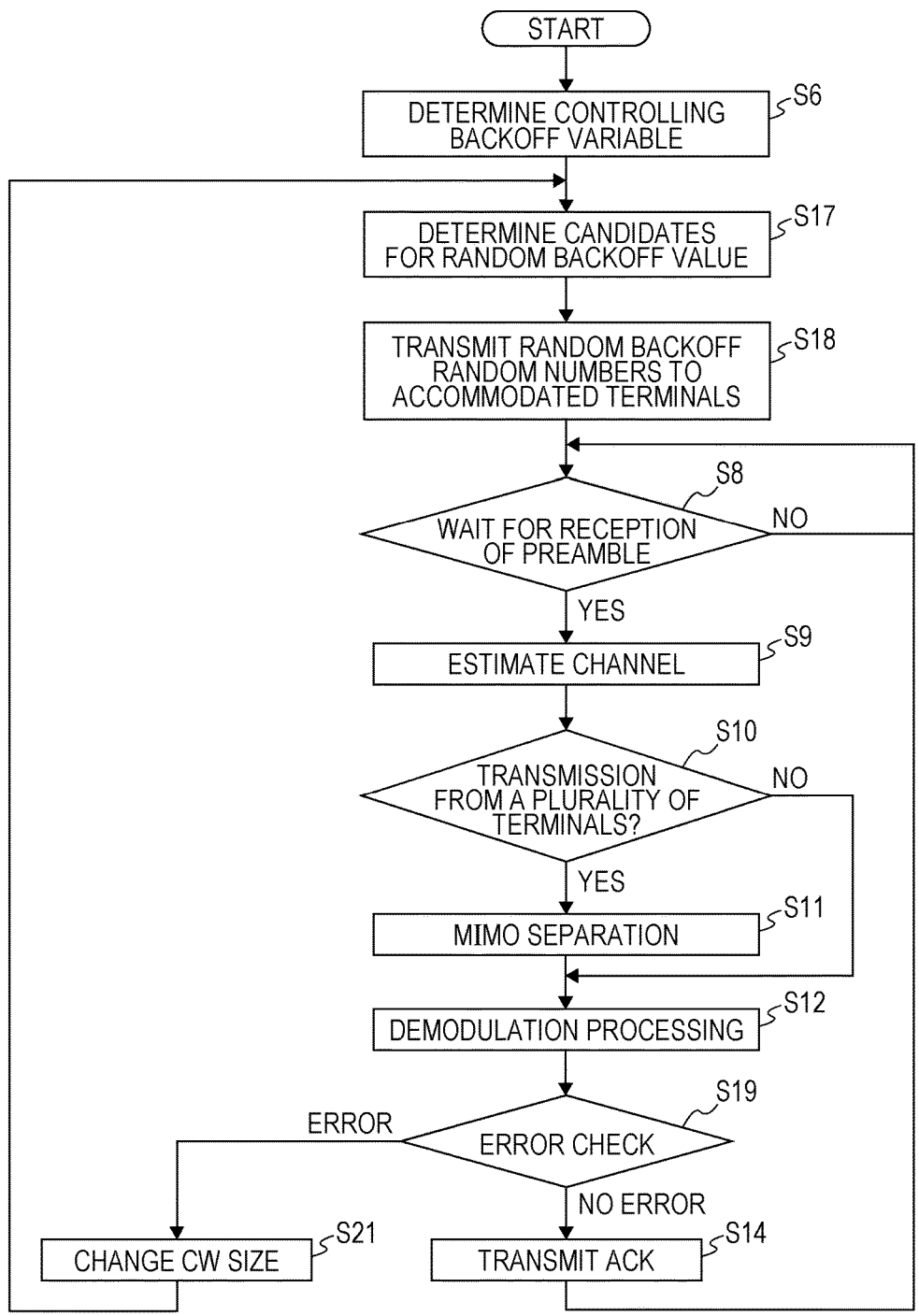
FIG. 12 is a flowchart diagram depicting the flow of processing which is performed from when the wireless base station determines a set of candidates for a random number value of random backoff, the set which is used by a terminal which is intended to perform MU-MIMO, till when reception of a signal from the wireless terminal station is completed.

FIG. 12 is a flowchart diagram depicting the flow of processing which is performed from when the wireless base station 1 determines a set of candidates for a random number value of random backoff, the set which is used by a terminal which is intended to perform MU-MIMO, till when reception of a signal from the wireless terminal station 2 is completed. Incidentally, processing similar to the processing of FIG. 5 of the first embodiment is written by using the same number.

The wireless base station 1 determines, in the controlling random backoff variable determining portion 115 of FIG. 11, a controlling random backoff variable for a wireless terminal station which is intended to perform MU-MIMO on a regular basis based on the number of accommodated terminals and the number of antennas of the wireless base station (step S6). Based on the controlling random backoff variable thus determined, the wireless base station 1 determines, in the random backoff value candidate set generating portion 250, a set of candidates for a random backoff value of a wireless terminal station which is intended to perform MU-MIMO (step S17). That is, in this embodiment, each wireless terminal station which is intended to perform MU-MIMO does not determine the CW size; the wireless base station determines the CW size.

An example of how to determine a set of candidates for a random backoff value in this embodiment will be described below.

As an example of a method for determining a set of candidates for a random backoff value in this embodiment, it is possible to use a CW size which is determined by a scheme similar to the existing scheme. An expected value of a candidate for random backoff of a wireless terminal station which is intended to perform MU-MIMO is configured to become 'CW size/2', and the number of candidates for a random backoff value is configured to become 'floor((1+CW size)*controlling random backoff variable)'. As for 'floor (x)' here, if the value of x for an integer a is '$a \le x < a+1$', 'floor(x)=a' is obtained.

By setting an expected value of a candidate for a random backoff value in the manner described above, an expected value of a backoff value which is selected by a terminal which is intended to perform MU-MIMO and an expected value of a backoff value which is selected by an existing terminal become equal when they have the same CW size.

This eliminates an advantage difference between a terminal which is intended to perform MU-MIMO (in this embodiment, the wireless terminal stations 2 and 4) and an existing terminal (in this embodiment, the wireless terminal stations 3 and 5). The controlling random backoff variable ($\ge 1$) here is similar to that described in the first embodiment. By changing a set of candidates for a random backoff value of a terminal which is intended to perform MU-MIMO on a regular basis, an advantage difference between two types of terminals (a terminal which is intended to perform MU-MIMO and an existing terminal) is further eliminated.

Figure 24:
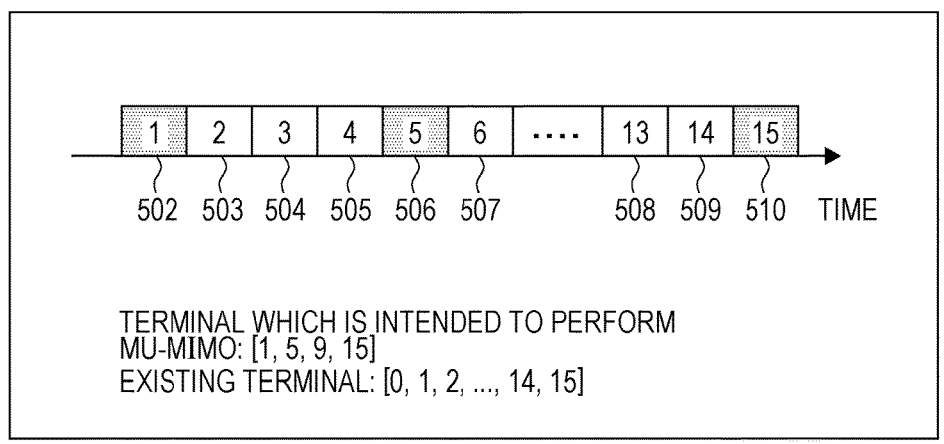
FIG. 24 is a diagram depicting an example of a set of candidates for a random backoff value of a terminal which is intended to perform MU-MIMO of this embodiment and a set of candidates for a random backoff value of a terminal that follows an existing scheme.

In FIG. 24, an example of a set of candidates for a random backoff value of a terminal which is intended to perform MU-MIMO of this embodiment and a set of candidates for a random backoff value of a terminal that follows the existing scheme is described. In FIG. 24, each of blank periods 502 to 510 corresponds to the slot time in the IEEE802.11 standards. Moreover, numbers (1 to 15) written in blanks are values of a backoff counter. In the example of FIG. 24, a case in which the CW size of a terminal which is intended to perform MU-MIMO and the CW size of an existing terminal are 15 and are equal is depicted.

When the controlling random backoff variable X=0.25, an expected value of a set of candidates for a random backoff value is 7.5 and the number of integers included in the set of candidates for a value is 4. In FIG. 24, as an example of a set of candidates for a random backoff value that satisfies the above-described relationship, {1, 5, 9, 15} is used. In FIG. 24, backoff times 502, 506, and 510 are candidates for a random backoff value which is used by the terminal which is intended to perform MU-MIMO. Moreover, since an existing terminal can take any one of all the backoff values within the CW size, a set of candidates for a random backoff value of the existing terminal is [0, 15]. They are uniform random numbers.

The set of candidates for a random backoff value thus determined is input to the frame generating portion 116 and is transmitted to the wireless terminal stations 2 and 4 via the transmitting portion 104, the switch 102, the wireless communicating portion 101a or 101b, and the antenna 100a or 100b (step S18). The wireless base station 1 waits for reception of a preamble (step S8). The processing which is performed from when the preamble is received (step S8) till when the demodulation processing is performed (step S12) is assumed to be similar to that of the first embodiment, and the description thereof is omitted because it has been given in FIG. 5.

The received signal subjected to the demodulation processing in the demodulating portion 108 is subjected to error check in the error checking portion 109 (step S19). If no error occurs in the error checking portion 109, the wireless base station 1 generates an ACK frame in the frame generating portion 116 for each terminal from which the signal has been received and transmits the ACK to each terminal from the antenna 100a or 100b via the transmitting portion 104, the switch 102, and the wireless communicating portion 101a or 100b (step S14). If an error occurs in step S19, in order to configure again a set of candidates for a random backoff value of the terminal which is intended to perform MU-MIMO, the CW size held in the CW size holding portion 117 is changed (step S12). As for a change of the CW size, for example, a scheme similar to the existing scheme of IEEE802.11 can be used.

The CW size for the terminal which is intended to perform MU-MIMO on which the processing based on equation (5) has been performed by using the changed CW size and the controlling random backoff variable is input to the CW size holding portion 117. Then, the wireless base station 1 determines, in the random backoff value candidate set generating portion 250, a set of candidates for a backoff value and transmits the new set of candidates for a random backoff value to the accommodated wireless terminal stations (the wireless terminal stations 2 and 4) by the antenna 100a or 100b via the frame generating portion 118, the transmitting portion 104, the switch 102, and the wireless communicating portion 101a or 101b.

Figure 13:
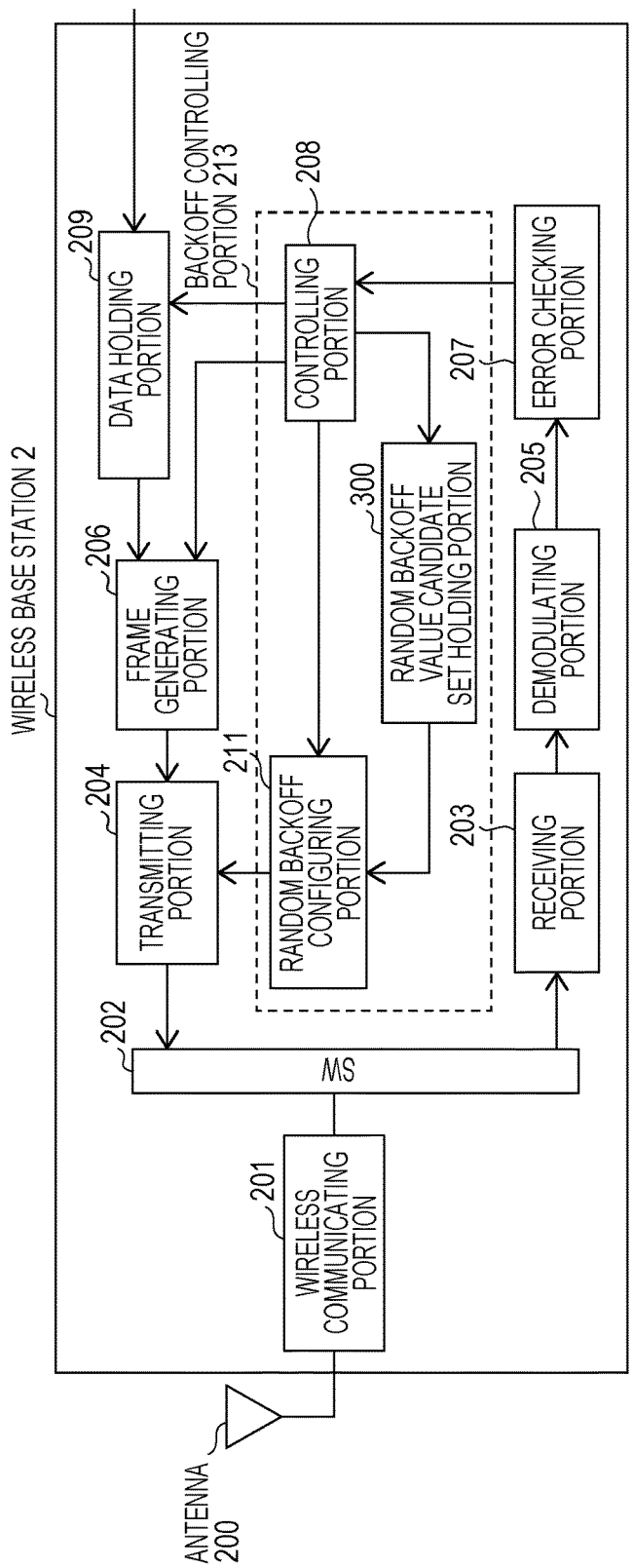
FIG. 13 is a diagram in which a random backoff random number holding portion is inserted in place of a CW size changing portion of FIG. 6.

FIG. 13 is a functional block diagram depicting a configuration example of the wireless terminal station 2 which is a terminal which is intended to perform MU-MIMO. The configuration example depicted in FIG. 13 has a random backoff random number holding portion 300 inserted in place of the CW size changing portion 210 of FIG. 6. In the random backoff value candidate set holding portion 300, a set of candidates for a random backoff value used by a terminal which is intended to perform MU-MIMO, the set notified by the wireless base station 1, is held. Moreover, in the drawing, the controlling portion 208, the random backoff random number holding portion 300, and the random backoff configuring portion 211 collectively form a backoff controlling portion 213.

As a result of each wireless terminal station holding a common set of candidates for a random backoff value which is used by a terminal which is intended to perform MU-MIMO, the probability of a collision of the transmit timing of terminals which are intended to perform MU-MIMO is increased, whereby uplink MU-MIMO communication is implemented. In the random backoff value candidate set holding portion 300, the current set of candidates for a backoff value is continuously held until a notification is received again.

Figure 14:
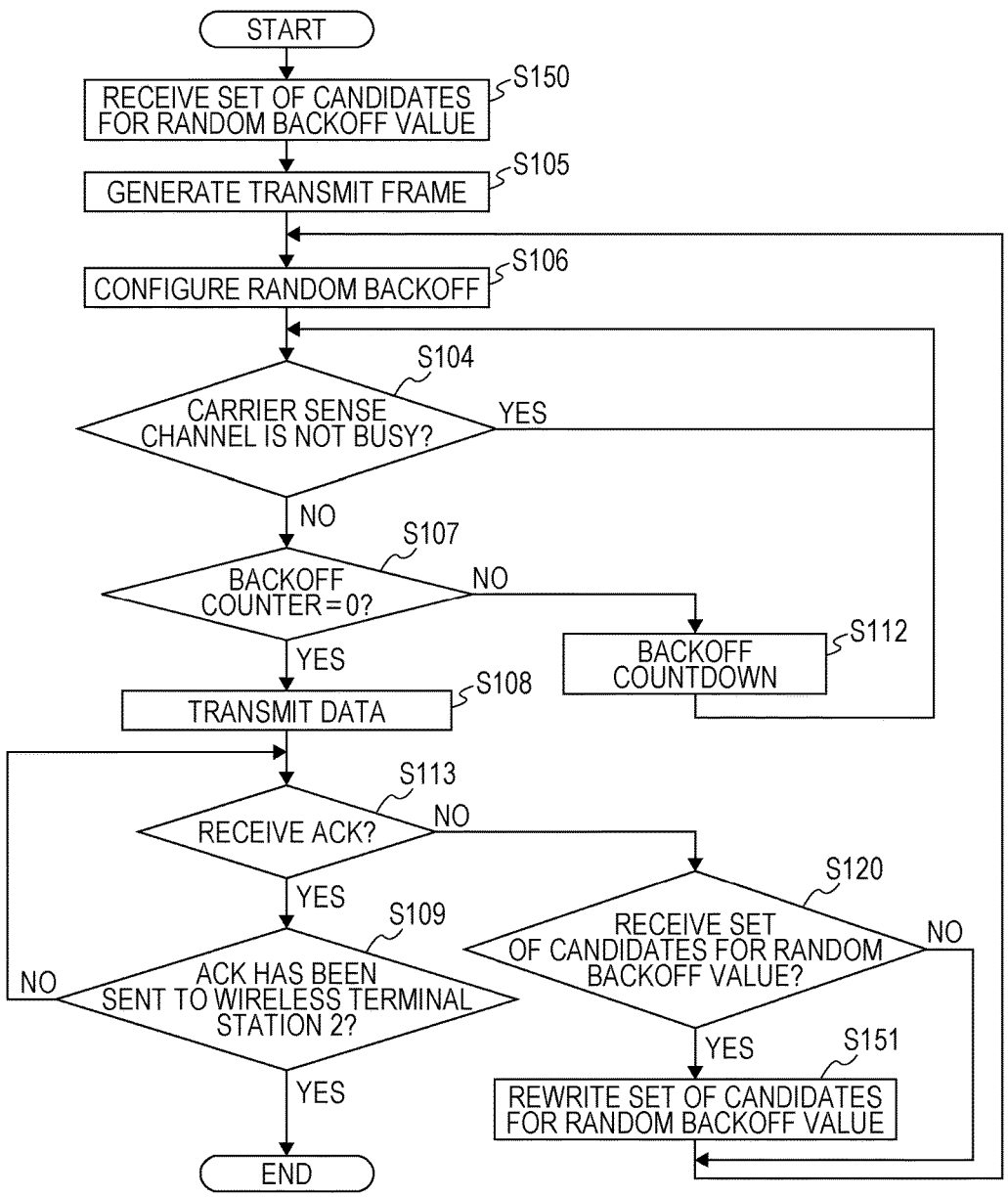
FIG. 14 is a flowchart diagram depicting the flow of processing which is performed by the wireless terminal station from a reception of a set of candidates for a random backoff value for a terminal station which is intended to perform MU-MIMO till transmission of a transmit frame.

FIG. 14 is a flowchart diagram depicting the flow of processing which is performed by the wireless terminal station 2 in this embodiment from reception of a set of candidates for a random backoff value for a terminal station which is intended to perform MU-MIMO till transmission of a transmit frame. However, at this time, the wireless terminal station 2 is a terminal which is intended to perform MU-MIMO. Moreover, since a flowchart diagram from when the wireless terminal station 2 transmits a connection request to the wireless base station till when association is established may be the same as that described in FIG. 7 of the first embodiment example, the description thereof is omitted. FIG. 14 is obtained by inserting reception of a set of candidates for a random backoff value (step S150) in place of reception of a controlling random backoff variable (step S103) and a change of a CW size (step S130) of FIG. 8 and inserting confirmation of reception of a set of candidates for a random backoff value (step S120) and rewriting of the set of candidates for a random backoff value (step S151) in place of a change of a CW size (step S114).

The wireless terminal station 2 receives a set of candidates for a random backoff value, the set notified by the wireless base station 1 (step S150). A signal from the wireless base station 1, the signal including the set of candidates for a random backoff value, is input to the error checking portion 207 via the wireless communicating portion 201, the switch 202, and the receiving portion 203. The signal including the set of candidates for a random backoff value, the signal subjected to error check in the error checking portion 207, is input to the random backoff value candidate set holding portion 300 and is held.

When transmit data is generated, the wireless terminal station 2 generates a transmit frame in the frame generating portion 206 (step S105). The generated transmit frame is input to the transmitting portion 204. In the random backoff configuring portion 211, the wireless terminal station 2 determines a backoff value randomly in such a way that the numbers included in the set held in the random backoff value candidate set holding portion 300 are selected with the same probability (step S106). When the backoff value is determined, the wireless terminal station 2 performs carrier sense and checks whether or not a channel is in a busy state (step S104). If the channel is busy in step S104, the wireless terminal station 2 waits until the channel enters an idle state. If the channel is not in a busy state, the wireless terminal station 2 checks whether or not the backoff value is 0 (step S107). If the backoff value is 0 in step S107, the wireless terminal station 2 determines that it is transmit timing. If the backoff value is not 0, the wireless terminal station 2 decrements the current count of the backoff value by 1 in the transmitting portion 204 (step S112).

After decrementing the backoff counter, the wireless terminal station 2 waits for the slot time and goes back to a step immediately after random backoff configuration (step S106). If determination is made in step S107 that it is transmit timing, the wireless terminal station 2 transmits the transmit frame generated in the frame generating portion 206 in the order of the preamble and the transmit data from the antenna 200 via the switch 202 and the wireless communicating portion 201 (step S108). However, the preamble is transmitted by the transmit resource allocated by the wireless base station and the transmit data is transmitted in the occupied band of the wireless terminal station 2.

After the transmit data of the wireless terminal station 2 is transmitted, the wireless terminal station 2 waits for a predetermined time until the wireless terminal station 2 receives an ACK (step S113). A terminal to which the above-described ACK has been sent becomes clear only when reception and demodulation are performed. Moreover, the predetermined time here is "the SIFS period+ the ACK frame length' in the IEEE802.11 standards. If an ACK has been received in the time in step S113, the wireless terminal station 2 demodulates the received ACK in the demodulating portion 205 via the wireless communicating portion 201, the switch 202, and the receiving portion 203 and checks whether the received ACK has been sent to the wireless terminal station 2 (step S109). If an ACK has not been received in step S113, the wireless terminal station 2 checks whether the wireless terminal station 2 receives a set of candidates for a random backoff value again (step S120). If a set of candidates for a random backoff value is received, a signal including the received set of candidates for a random backoff value is input to the error checking portion 207 via the wireless communicating portion 201, the switch portion 202, the receiving portion 203, and the demodulating portion 205. The signal subjected to error check in the error checking portion 207 is input to the backoff controlling portion 213. The signal input to the backoff controlling portion 213 rewrites the set of candidates for a random backoff value held in the random backoff value candidate set holding portion 300 (step S151) via the controlling portion 208 and resumes the procedure from configuration of a random backoff value in the random backoff configuring portion 211 (step S106). If the set of candidates for a random backoff value has not been received in step S120, rewriting is not performed and the procedure is resumed from random backoff configuration in the random backoff configuring portion 211 (step S106). If the ACK received in step S109 has been sent to the wireless terminal station 2, the processing is ended. If the received ACK has not been sent to the wireless terminal station 2, the wireless terminal station 2 waits for reception of an ACK again (step S113).

The existing wireless terminal stations 3 and 5 perform data transmission based on the existing IEEE802.11 standards.

Figure 15:
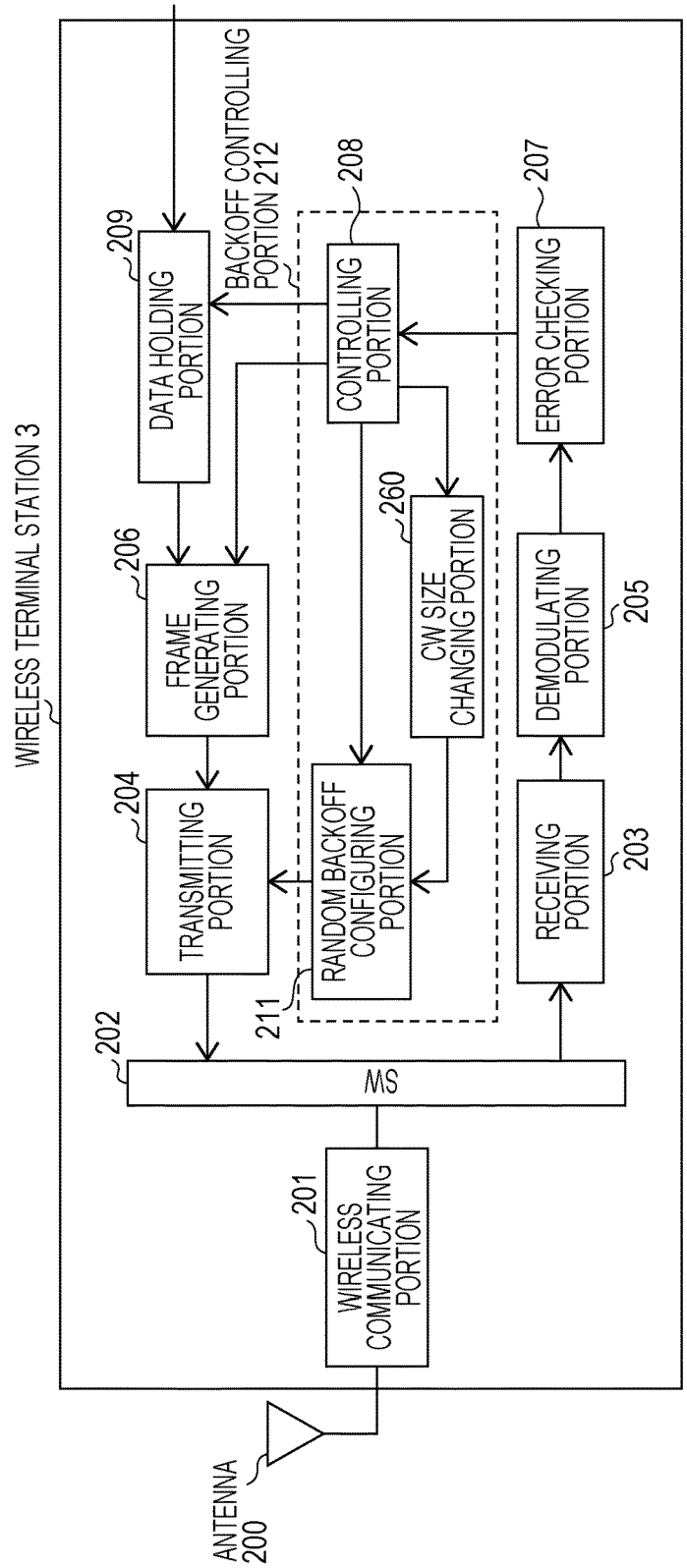
FIG. 15 illustrates a functional block diagram depicting a configuration example of the wireless terminal station.

FIG. 15 illustrates a functional block diagram depicting a configuration example of the wireless terminal station 3. FIG. 15 is obtained by replacing the wireless terminal station 2 of FIG. 6 with the wireless terminal station 3. However, since the CW size changing portion 210 of FIG. 6 and a CW size changing portion 260 of FIG. 15 differ in operation, they are identified with different numbers. In the CW size changing portion 260 in this embodiment, unlike the first embodiment, the CW size is not changed by the controlling random backoff variable. However, a scheme by which the CW size is increased when transmission has been performed unsuccessfully is similar to that of the first embodiment and a scheme that conforms to the IEEE802.11 scheme is taken up as an example.

Figure 16:
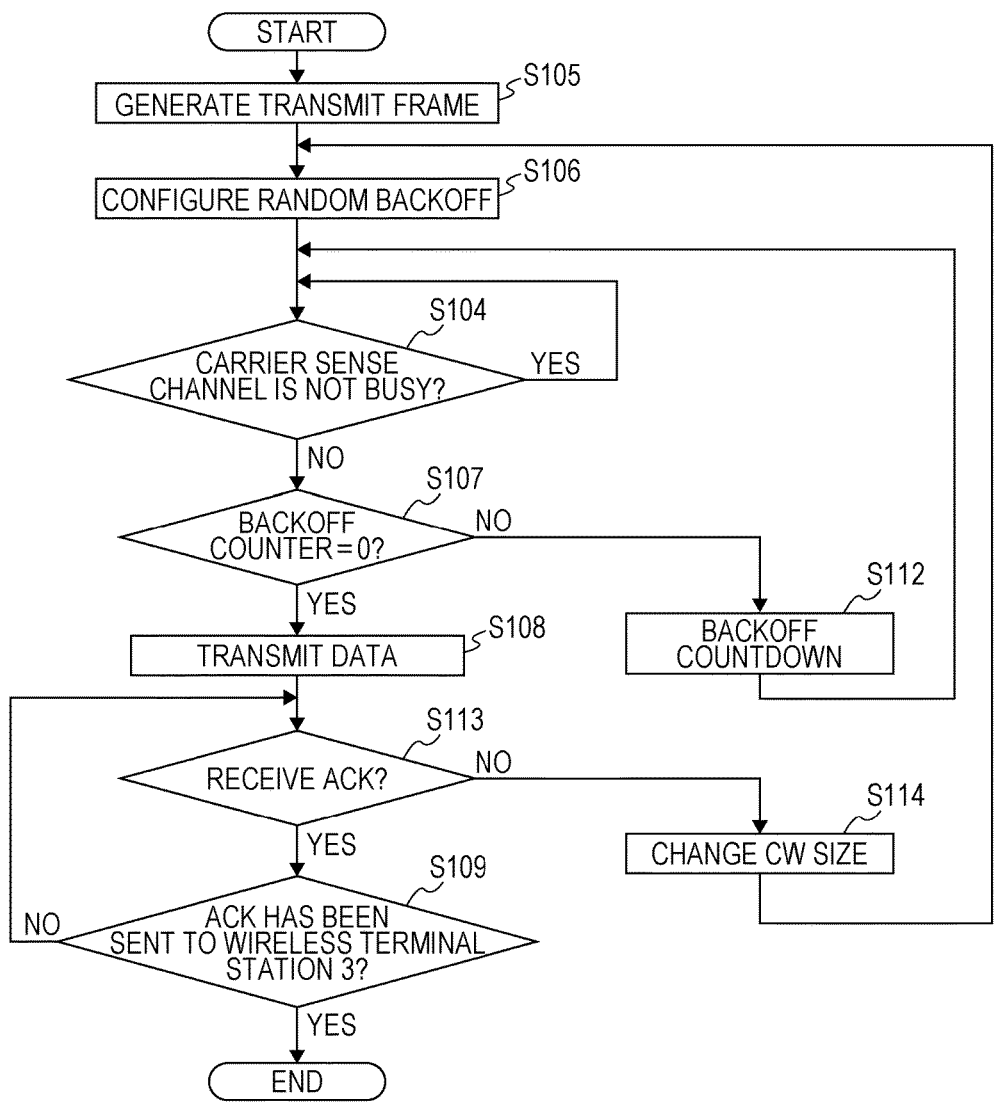
FIG. 16 is a flowchart diagram depicting the flow of processing of the wireless terminal station.

FIG. 16 is a flowchart diagram depicting the flow of processing of the wireless terminal station 3. The processing depicted in FIG. 16 is obtained by removing the controlling random backoff variable reception processing (step S103) and the CW size change processing (step S130) of FIG. 8.

When transmit data is generated, the wireless terminal station 3 generates a transmit frame in the frame generating portion 206 (step S105). The generated transmit frame is input to the transmitting portion 204. In the random backoff configuring portion 211, based on the CW size of the terminal, as uniform random numbers of [0, CW size], the wireless terminal station 3 determines a backoff value (step S106).

The processing from the backoff configuration (step S106) to end is assumed to be similar to that of the first embodiment, and the description thereof is omitted because it has been given above by using FIG. 8. However, the CW size changing portion 210 in the first embodiment is the CW size changing portion 260 in this embodiment.

Figure 17:
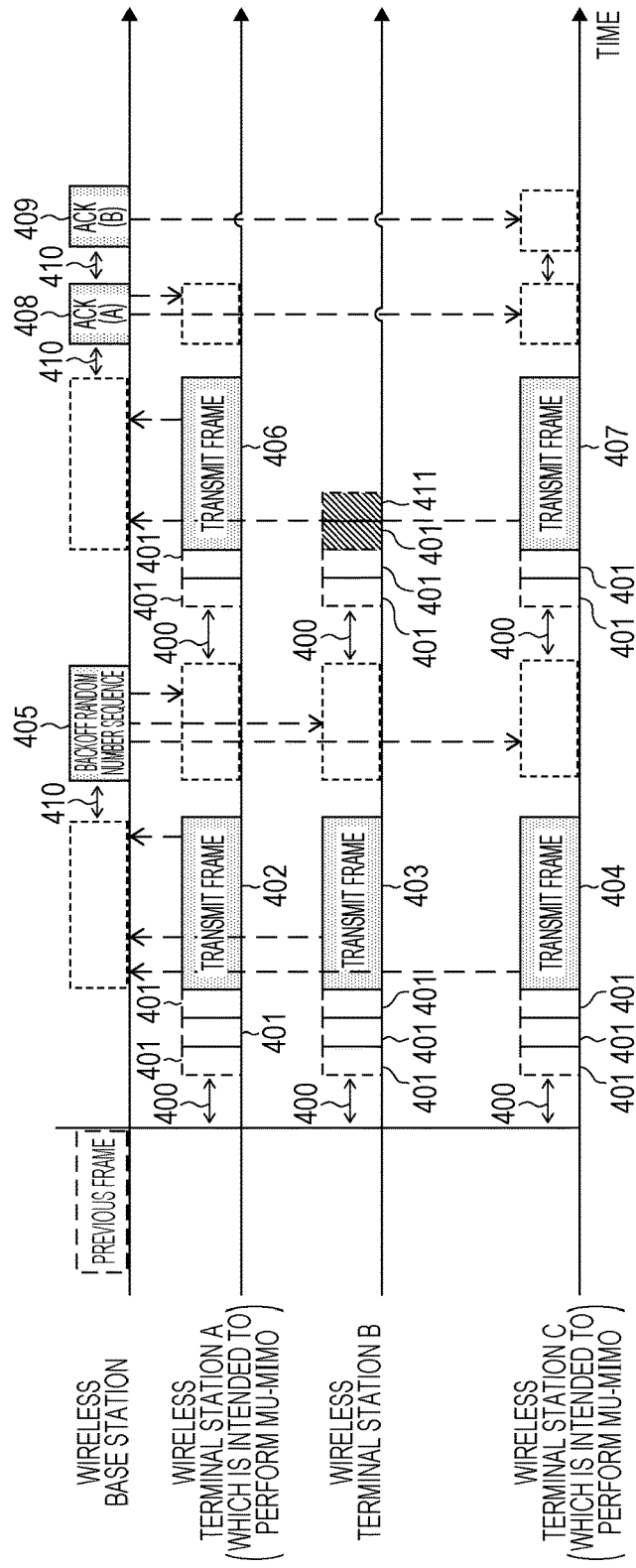
FIG. 17 is a timing diagram of this embodiment.

FIG. 17 is a timing diagram of this embodiment. Wireless terminal stations A and C are terminals which are intended to perform MU-MIMO, and a wireless terminal station B is an existing terminal. Moreover, the wireless base station has two antennas. In FIG. 17, a case in which the wireless terminal stations A, B, and CC select the same backoff value as their respective first backoff values is depicted. After the completion of transmission of the previous frame, the wireless terminal stations wait only for a DIFS period (a blank period 400) in IEEE802.11 and then start counting down from their respective backoff values. Here, the blank period 401 is the slot time in the IEEE802.11 standards. Since the backoff values of the wireless terminal stations A, B, and C are 3, transmit frames 402, 403, and 404 of the three terminals are transmitted at the same time. Here, the transmit frame 402 is the transmit frame of the wireless terminal station A. Moreover, the contents of the transmit frame 402 are a preamble signal which is transmitted by a specified resource and transmit data which is transmitted in the occupied band of the wireless terminal station A. Likewise, the transmit frame 403 is the transmit frame of the wireless terminal station B, and the transmit frame 404 is the transmit frame of the wireless terminal station C.

Since the wireless base station has received the transmit frames from the three terminals at the same time, the wireless base station cannot perform MIMO separation, and an error occurs. Thus, a new set 405 of candidates for a random backoff value is transmitted to the accommodated wireless terminal stations. A blank period 410 here corresponds to the SIFS period in the IEEE802.11 standards.

The wireless terminal stations A and C configure a backoff value again from the new set of candidates for a random backoff value. The wireless terminal station which is the existing terminal configures a backoff value again by increasing the CW size. After waiting for a period corresponding to the DIFS period, the terminals start counting down from their respective backoff values. Here, since the wireless terminal stations A and C select 2 as the backoff value which has been configured again and the wireless terminal station B selects 4 as the backoff value which has been configured again, the transmit frames of the wireless terminal stations A and C are first transmitted. Therefore, a slot time 421 corresponding to two counts, the slot time 421 held by the wireless terminal station B, is used by the wireless terminal station B at the time of next transmission.

When the backoff value becomes 0, the wireless terminal stations A and C transmit their respective transmit frames 406 and 407. The transmit frames 406 and 407 are the frames having the same contents as the transmit frames 402 and 404 generated last time for transmission. This is because the wireless terminal stations A and C performed retransmission because they could not receive ACKs sent thereto last time.

Due to reception from the two terminals, the wireless base station transmits an ACK(A) 408 and an ACK(B) 409 to the terminals. When the wireless terminal stations A and B receive the ACKs sent thereto, the transmission is ended.

Incidentally, in this embodiment, a method for selecting a terminal which is intended to perform MU-MIMO is not specified; as an example, there is a scheme by which a terminal which is intended to perform MU-MIMO is selected depending on the size of a transmit frame. If dot11RTSThreshold in the IEEE802.11 standards is set as a selection threshold value for this transmit frame, since a wireless terminal station which does not perform RTS/CTS exchange performs MU-MIMO and a terminal which performs RTS/CTS exchange can perform transmission for itself, the probability that an RTS signal which is transmitted by a certain terminal and a data frame which is transmitted by a certain terminal collide with each other is reduced.

As described above, in this embodiment, by limiting a set of candidates for a backoff value of a terminal which is intended to perform MU-MIMO, it is possible to connect a terminal which is intended to perform MU-MIMO and a terminal that follows the existing scheme to the AP at the same time.

Third Embodiment

In this embodiment, a case in which accommodated wireless terminal stations are divided into two groups in accordance with the size of a transmit frame and candidates for a random backoff value which can be adopted by each group are distributed in such a way that overlapping does not occur, whereby a collision between transmit data of the groups is avoided will be described.

In this embodiment, an embodiment of a system model formed of the wireless base station 1 of FIG. 1 and the wireless terminal stations 2 to 5 accommodated in the wireless base station 1 will be described.

Figure 19:
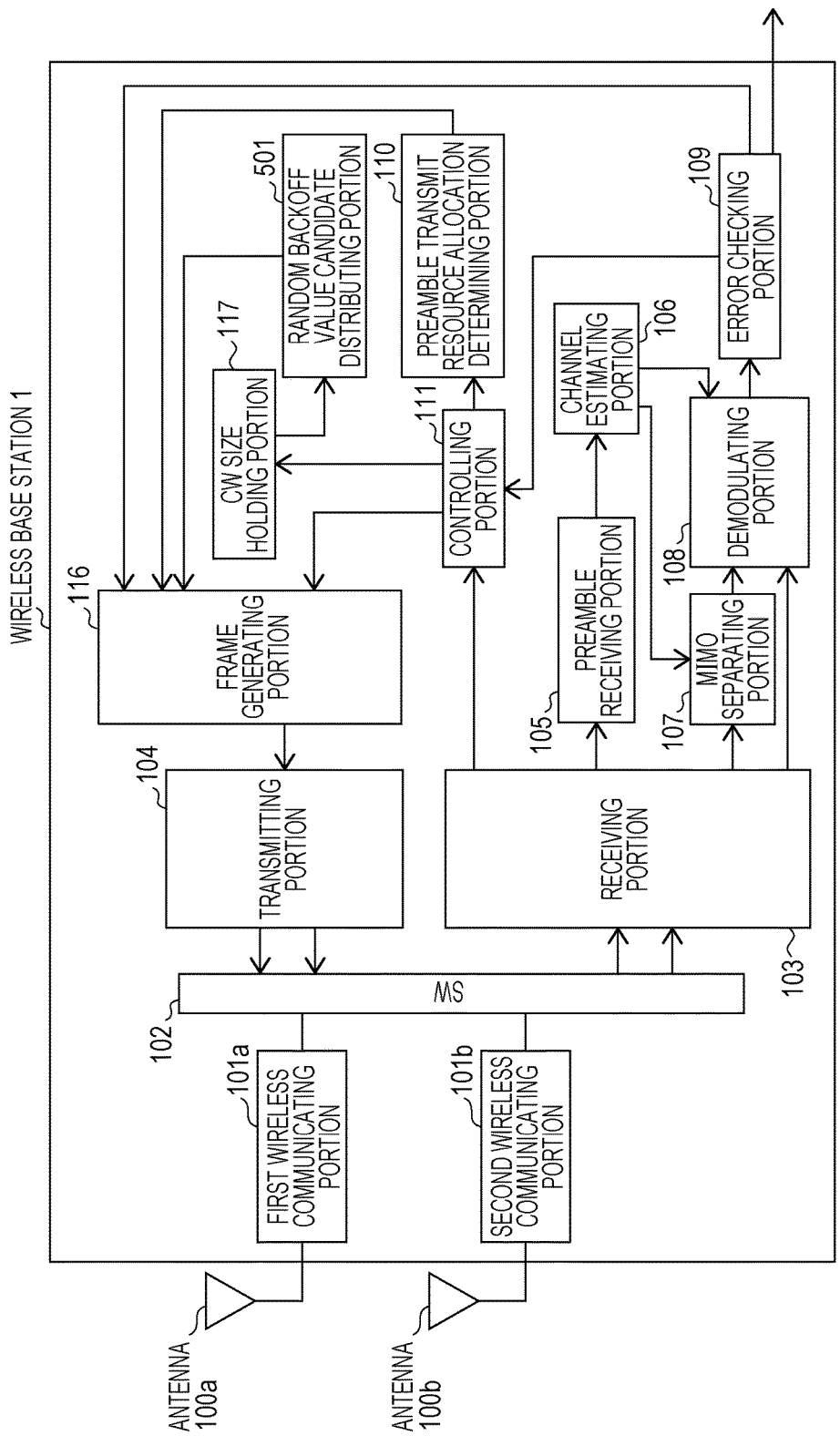
FIG. 19 is a functional block diagram depicting a configuration example of a wireless base station according to a third embodiment of the present invention.

FIG. 19 is a functional block diagram depicting a configuration example of the wireless base station 1 according to the third embodiment. FIG. 19 is obtained by removing the controlling random backoff variable determining portion 115 and the random backoff value candidate set generating portion 250 of FIG. 11 and inserting a random backoff value candidate distributing portion 501 between the controlling portion 111 and the frame generating portion 116.

Figure 20:
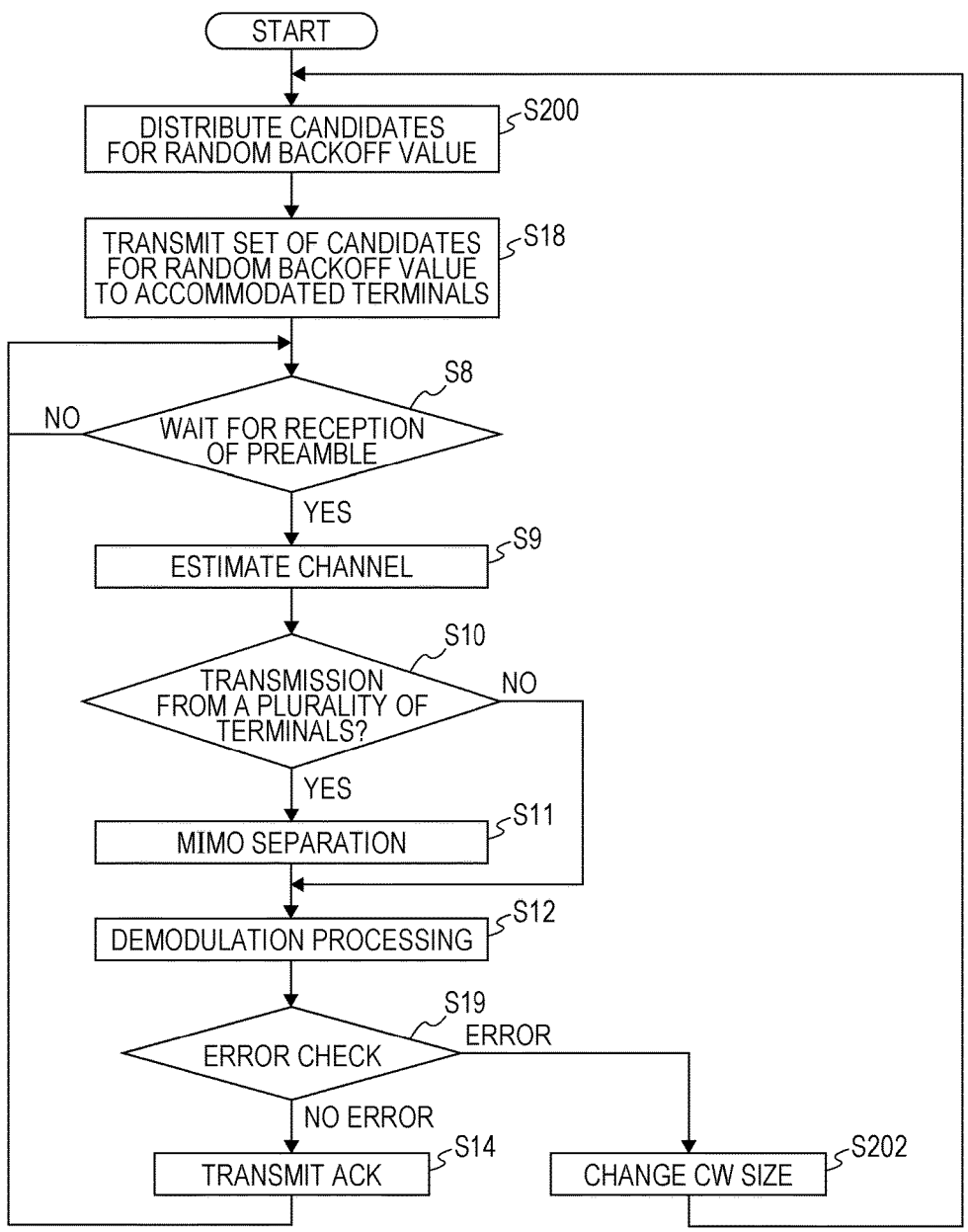
FIG. 20 is a flowchart diagram from when the wireless base station makes a notification of a set of candidates for a random backoff value of each group till when data is received from a certain wireless terminal station.

FIG. 20 depicts a flowchart from when the wireless base station 1 makes a notification of a set of candidates for a random backoff value of each group till when data is received from a certain wireless terminal station. Incidentally, the processing which is performed from when a connection request is received from a wireless terminal station till when association is established is assumed to be similar to that of the first embodiment, and the description thereof is omitted because it has been given by using FIGS. 3 and 4.

In the random backoff value candidate distributing portion 501 of FIG. 19, a set of candidates for a random backoff value of each group is distributed from a set of [0, CW size] on a regular basis (step S200). An example of how to perform distribution at this time will be described below.

Figure 18:
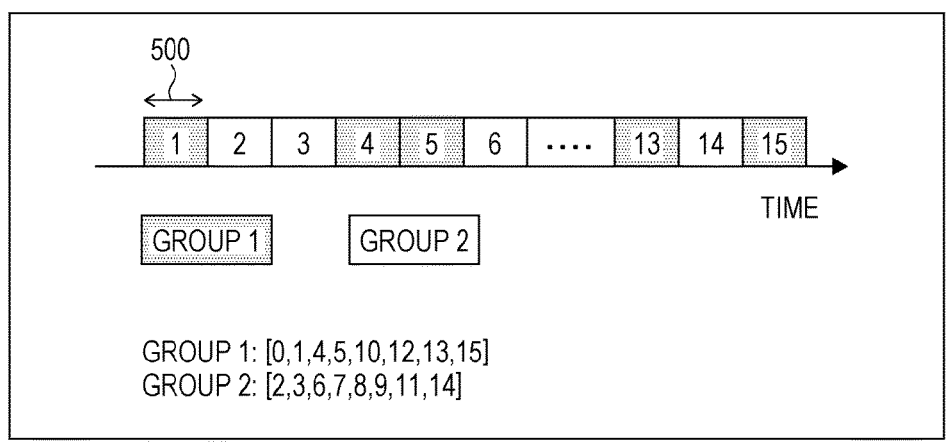
FIG. 18 is a diagram depicting an example of candidates for a random backoff value when a CW size is 15.

Settings are made such that an expected value of a set of candidates for a random number value of each group becomes CW size/2 and the number of candidates for a random backoff value becomes floor((CW size+1)/2). At this time, settings are made such that the candidates for a random backoff value of two groups do not take the same values. FIG. 18 is a diagram depicting an example of candidates for a random backoff value when the CW size is 15. However, a time 500 of FIG. 18 corresponds to the slot time in the IEEE802.11 standards.

After the completion of distribution of candidates for a random backoff value to the groups, the wireless base station 1 generates a frame including a set of these candidates for a random backoff value in the frame generating portion 116 and transmits the set to the accommodated terminals of the wireless base station from the antenna 100 via the transmitting portion 104, the switch 102, and the wireless communicating portion 101 (step S18). After finishing transmission to each terminal, the wireless base station 1 waits for reception of a preamble (step S8). The processing from reception of a preamble (step S8) to the demodulation processing (step S12) is assumed to be similar to that of the first embodiment, and the description thereof is omitted because it has been given by using FIG. 5.

Figure 21:
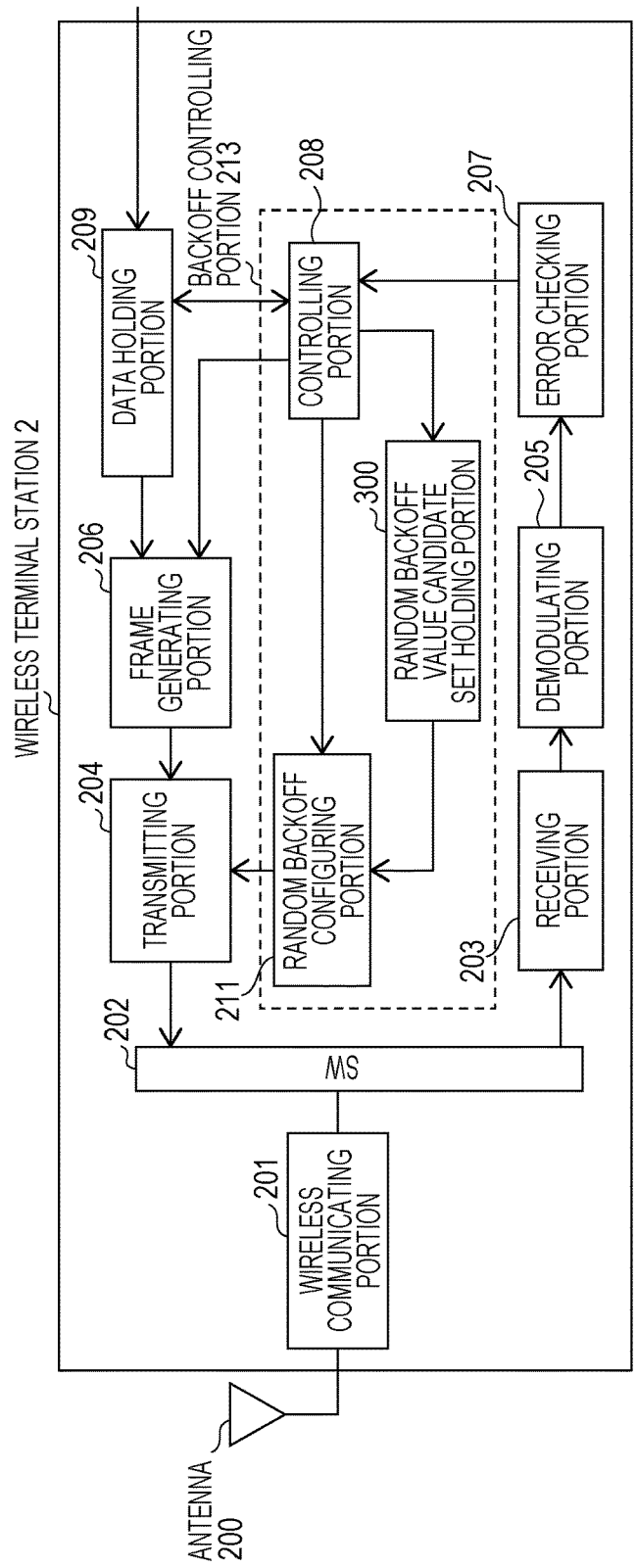
FIG. 21 is a functional block diagram depicting a configuration example of a terminal station of wireless communication in this embodiment.
Figure 22:
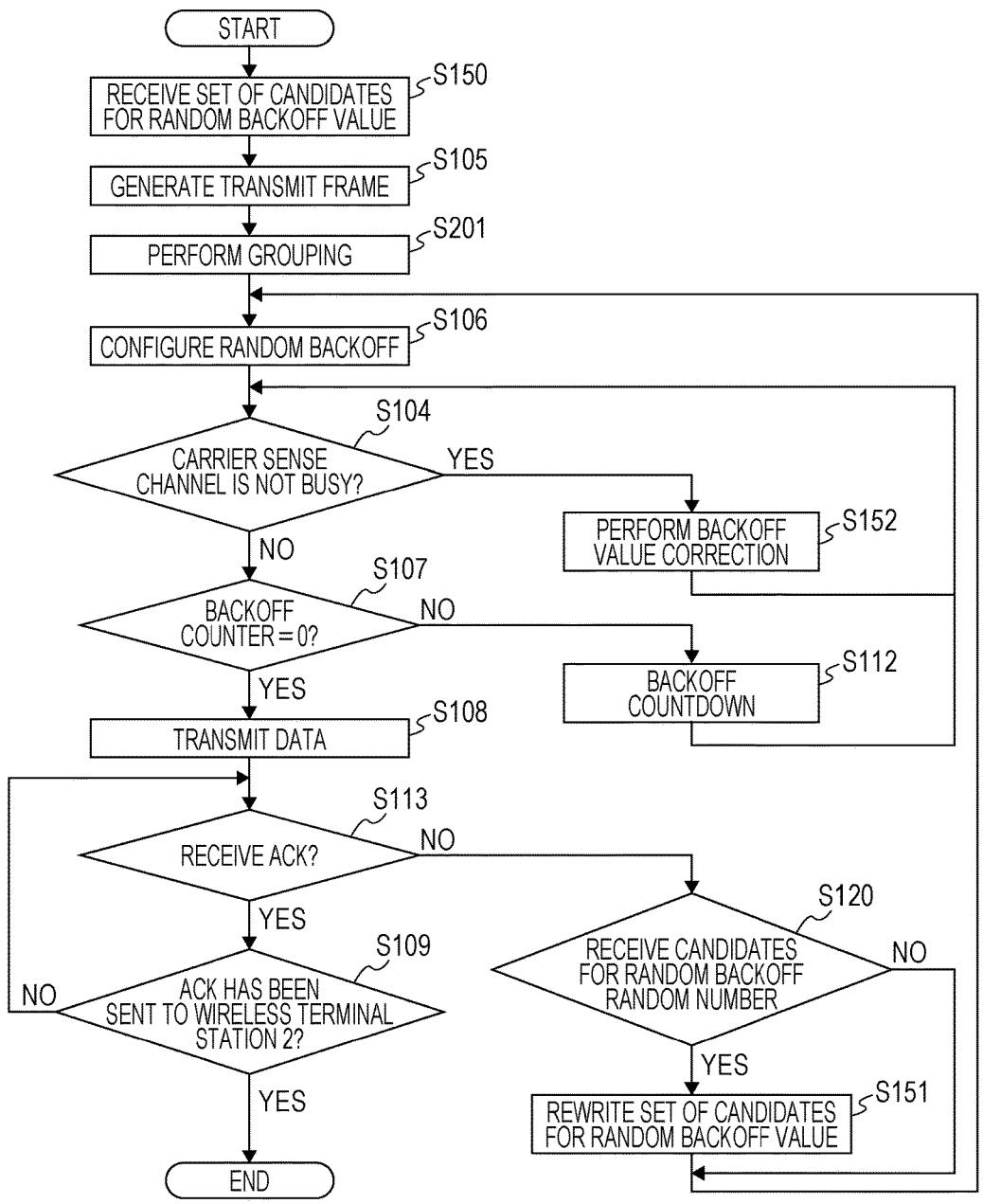
FIG. 22 is a flowchart diagram depicting the flow of processing of the wireless terminal station depicted in FIG. 21.

The signal subjected to the demodulation processing is subjected to error check in the error checking portion 109 (step S19). If no error has occurred, the wireless base station 1 returns an ACK for each of the terminals that have transmitted data. If an error has occurred in step S19, the wireless base station 1 increases, in the CW size holding portion 117, the CW size held therein (step S202). The CW size to be increased is assumed to be similar to that in the existing IEEE802.11 standards and to be determined by equation (7). FIG. 21 is a functional block diagram depicting a configuration example of the wireless communication terminal station 2 in this embodiment. FIG. 21 is obtained by bidirectionally connecting the controlling portion 208 and the data holding portion 209 of FIG. 13. FIG. 22 is a flowchart diagram depicting the flow of processing related to FIG. 21.

The wireless terminal station 2 receives, from the wireless base station, a signal including a set of candidates for a random backoff value of each group by the antenna 200 (step S150). The received signal is input to the error checking portion 207 via the wireless communicating portion 201, the switch 202, the receiving portion 203, and the demodulating portion 205. After the absence of an error is confirmed in the error checking portion 207, the signal is subjected to processing by the controlling portion and is then input to the random backoff value candidate set holding portion 300. This random backoff value candidate set holding portion 300 holds a set of candidates for a backoff value that can be adopted by each group. As is the case with that described in the second embodiment, the random backoff value candidate set holding portion 300 continuously holds the current set of candidates for a backoff value until the random backoff value candidate set holding portion 300 receives a notification of a set of candidates for a random backoff value again from the wireless base station 1.

The data in the data holding portion 209 is input to the frame generating portion 206, and a transmit frame is generated (step S105). Based on the generated frame, grouping is performed (step S201). An example of grouping will be described below.

In this embodiment, the length of a transmit frame length is used for grouping. By using a certain threshold value for the frame length of transmit data, separation into two groups is performed. In this embodiment, this threshold value is called a "grouping threshold value". Grouping is performed as follows: if "the transmit frame length≤the grouping threshold value", it belongs to group 1, and, if the transmit frame length>the grouping threshold value", it belongs to group 2.

Incidentally, as an example, when dot11RTSThreshold of the IEEE802.11 standards is adopted as this grouping threshold value, the possibility of a collision between the transmit timing of a wireless terminal station which does not perform RTS/CTS exchange and the transmit timing of a terminal which performs RTS/CTS exchange is reduced.

After grouping is performed by the above-described method, of the sets of candidates for a random backoff value held in the random backoff value candidate set holding portion 300, by using a set of candidates for a random backoff value of a group to which the wireless terminal station 2 is allocated, the wireless terminal station 2 configures a backoff value in the random backoff configuring portion 211 (step S106).

After finishing configuration of a backoff value, the wireless terminal station 2 performs carrier sense and checks whether or not a channel is busy (step S104). If the channel is busy, the wireless terminal station 2 performs backoff value correction (step S152). Backoff value correction is correction which is performed on the current backoff value to change it to a value included in the set of candidates for a random backoff value, the set to which the group of the wireless terminal station 2 is allocated. Therefore, correction is not particularly required immediately after backoff configuration (step S106). As for step S152, a description thereof will be given after the backoff value is reduced (step S112). If the channel is not busy in step S104, the wireless terminal station 2 checks whether the backoff value is 0 (step S107). If the backoff counter is not 0, the wireless terminal station 2 performs carrier sense again and checks whether or not the channel is busy. If the channel is busy, the wireless terminal station 2 determines that another terminal has already started transmission. In the first and second embodiments, if another wireless terminal station starts transmission while the wireless terminal station 2 is counting down from the backoff value, the current backoff value on which a countdown is being performed is held and the held backoff value when an attempt to perform transmission is made again is used as the current backoff value; in this embodiment, since settings are made such that backoff values that can be taken by groups differ from one group to another, there is a possibility that the remaining count is not a backoff value to which the group of the wireless terminal station 2 is allocated.

Therefore, before the procedure is returned to a step immediately after the random backoff configuration (step S106), the wireless terminal station 2 performs correction to change the backoff value to a value included in the set of candidates for a random backoff value to which the group of the wireless terminal station 2 is allocated (step S152). As an example of this correction method, "making a correction to change the backoff value to a value closest to the current count of the backoff values allocated to the group of the wireless terminal station 2", "making a correction to change the backoff value to a value which is smaller than the remaining count and is closest to the remaining count in the group of the wireless terminal station 2", "making no correction by determining that the suspended current backoff value may be equal thereto within the same group", or the like can be used.

When the channel enters an idle state, after the wireless terminal station 2 waits for the DIFS period in IEEE802.11, by using the backoff value corrected in step S152, the wireless terminal station 2 starts counting down from the backoff values again. If the backoff value is 0 in step S110, the wireless terminal station 2 determines that it is transmit timing and transmits data (step S108).

After performing data transmission (step S108), the wireless terminal station 2 waits for reception of an ACK (step S113). When an ACK is received, the wireless terminal station 2 checks whether the ACK has been sent thereto (step S109). If an ACK has not been received in step S113, the wireless terminal station 2 checks whether the wireless terminal station 2 receives a signal including a set of candidates for a random backoff value again (step S120). If the wireless terminal station 2 has received a set of candidates for a random backoff value again, the wireless terminal station 2 performs configuration of a backoff value again by using the candidate values (step S106). If the wireless terminal station 2 has not received a set of candidates for a random backoff value in step S120, the set of candidates for a random backoff value and the group are not changed and the wireless terminal station 2 determines a backoff value again (step S106).

If the ACK received in step S109 has been sent to the wireless terminal station 2, the processing is ended. If the ACK received in step S109 has not been sent thereto, the wireless terminal station 2 waits for another reception of an ACK.

Figure 23:
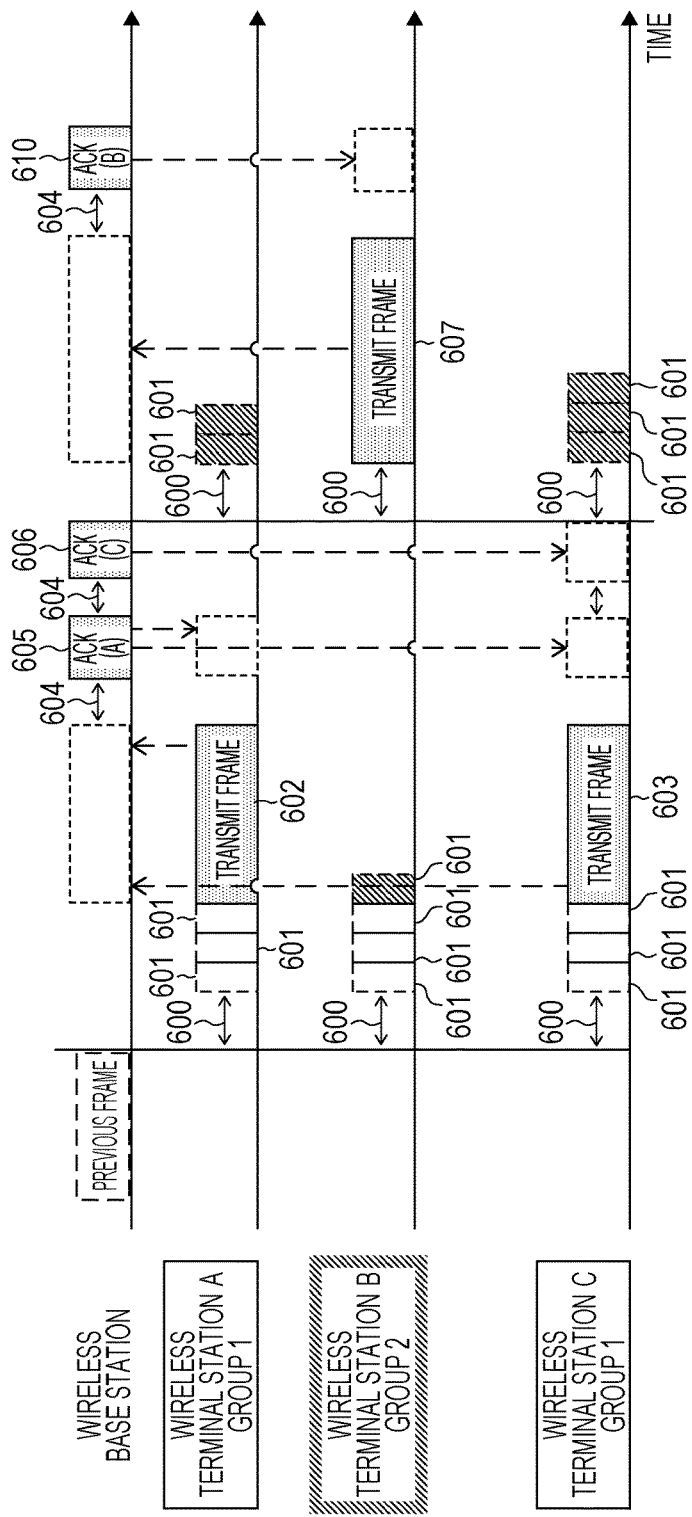
FIG. 23 is a timing diagram in communication of this embodiment.

FIG. 23 is a timing diagram of this embodiment. Moreover, in an example of FIG. 23, all the transmit frame lengths are assumed to be shorter than or equal to dot11RTSThreshold of the IEEE802.11 standards. Therefore, RTS/CTS exchange is not performed. Furthermore, in the example of FIG. 23, the grouping threshold value is a predetermined value which is smaller than dot11RTSThreshold of the IEEE802.11 standards.

The example depicted in FIG. 23 is formed of one wireless base station and wireless terminal stations A to C. In this embodiment, grouping is performed based on the frame length of transmit data; in FIG. 23, to make descriptions easier to understand, a group to which a terminal belongs after frame generation of transmit data is written in advance.

After the completion of transmission of the previous frame, after waiting for a DIFS period (a blank period 600) in the IEEE802.11 standards, the terminals start counting down from their respective backoff values. Here, every blank period 601 corresponds to the slot time in the IEEE802.11 standards. It is assumed that, depending on the length of a transmit frame, 3 is selected as a backoff value of the wireless terminal stations A and C belonging to group 1 and 4 is selected as a backoff value of the wireless terminal station B belonging to group 2. Therefore, the wireless terminal stations A and C transmit a transmit frame 602 and a transmit frame 603, respectively, to the wireless base station at the same time, and MU-MIMO communication is implemented. Incidentally, the transmit frame 602 here is a transmit frame of the wireless terminal station A, including a preamble which is transmitted by a specified preamble resource and transmit data which is transmitted in the occupied band of the wireless terminal station A. Likewise, the transmit frame 603 is a transmit frame which is transmitted by the wireless terminal station C.

The wireless base station that has received the transmit frames from the two terminals at the same time transmits, to the wireless terminal stations A and C, respectively, an ACK(A) 605 after waiting for a period (a blank period 604) corresponding to the SIFS period in the IEEE802.11 standards and an ACK(C) 606 after waiting for another period corresponding to the SIFS period. The ACK(A) 605 is an ACK for the wireless terminal station A, and, likewise, the ACK(C) 606 is an ACK for the wireless terminal station C.

After the completion of transmission of the ACKs to the wireless terminal stations A and C, a terminal having transmit data starts counting down from the backoff value by using the backoff value that has been configured again.

The remaining backoff value of the wireless terminal station B which is counting down from the backoff value is 1. However, the set of candidates for a random backoff value to which the group 2 is assigned does not include 1, and correction is made to change the backoff value of the wireless terminal station B to 0 that is a value which is smaller than 1 and is closest to 1, the value of the set of candidates for a random backoff value to which the group 2 is allocated. Therefore, the wireless terminal station B transmits a transmit frame 607 immediately after waiting for the DIFS period (the blank period 600). The transmit frame 607 is formed of a preamble which the wireless terminal station B transmits by a resource for transmitting preamble specified by the wireless base station and transmit data which the wireless terminal station B transmits in the occupied band of the wireless terminal station B.

The wireless base station which has received the transmit frame 607 from the wireless terminal station B transmits an ACK(B) 610 to the wireless terminal station B. Incidentally, as is the case with the second embodiment, also in this embodiment, a case in which a blank period is inserted between ACKs when a plurality of ACKs are transmitted from the wireless base station; however, an example in which no blank period is provided between the ACKs is also possible.

As described above, also in this embodiment, it is possible to implement MU-MIMO communication with little change in the existing scheme of the IEE802.11 standards. Moreover, since allocation is performed such that backoff values that can be taken by groups differ from one group to another, it is possible to avoid a collision of transmit frames between the groups.

Incidentally, in the embodiments described above, the configurations and so forth depicted in the attached drawings are not limited thereto and can be appropriately changed within a scope in which the advantages of the present invention can be produced. In addition, the present invention may be carried out with appropriate changes made therein without departing from the intended scope of the present invention.

Moreover, any one of the component elements of the present invention can be arbitrarily chosen, and an invention provided with the chosen component is also included in the present invention.

Furthermore, processing of each portion may be performed by recording a program for implementing the functions described in the embodiments on a computer-readable recording medium and making a computer system read and execute the program recorded on the recording medium. Incidentally, it is assumed that the "computer system" here includes an OS and hardware such as peripheral devices.

Moreover, in a case where the WWW system is used, it is assumed that the "computer system" also includes a homepage offering environment (or display environment).

Furthermore, the "computer-readable recording medium" refers to portable media such as a flexible disk, a magneto-optical disk, ROM, and a CD-ROM and storage media such as a hard disk incorporated into the computer system. In addition, it is assumed that the "computer-readable recording medium" includes what dynamically holds a program for a short time, such as a communication wire used when a program is sent via a network such as the Internet or a communication line such as a telephone line and what holds the program for a predetermined amount of time, such as volatile memory in the computer system functioning as a server or a client in that case. Moreover, the above-described program may be provided for implementing part of the functions described above and may be what that can implement the functions described above by being combined with a program that is already recorded on the computer system. At least part of the functions may be implemented by hardware such as an integrated circuit (which is sometimes referred to as a processor).

INDUSTRIAL APPLICABILITY

The present invention can be used in a communication apparatus.

REFERENCE SIGNS LIST

A wireless communication system
wireless base station
2 to 5 wireless terminal station
100*a*, 100*b* antenna
101*a* first wireless communicating portion
101*b* second wireless communication station
102 switch (SW)
104 transmitting portion
116 frame generating portion
111 controlling portion
110 resource for transmitting preamble allocation determining portion
115 controlling random backoff variable determining portion
105 preamble receiving portion
106 channel estimating portion
107 MIMO demodulating portion
108 demodulating portion
109 error checking portion
200 antenna
201 wireless communicating portion
202 switch
203 receiving portion
204 transmitting portion
205 demodulating portion
206 frame generating portion
207 error checking portion
208 controlling portion
209 data holding portion
210 CW size changing portion
211 random backoff configuring portion

The invention claimed is:
1. A wireless terminal station apparatus that is used in a wireless communication system including one wireless base station apparatus and a plurality of wireless terminal station apparatuses, the wireless terminal station apparatus comprising:

circuitry; and memory associated with the circuitry; wherein the circuitry controls switching between single user transmission in which only the wireless terminal station apparatus performs transmission to the wireless base station apparatus, and multi user transmission in which the wireless terminal station apparatus performs transmission to the wireless base station apparatus simultaneously with at least one of the plurality of wireless terminal station apparatuses other than the wireless terminal station apparatus, as a communication system when the wireless terminal station apparatus performs transmission to the wireless base station apparatus;

the circuitry performs backoff control with a first candidate for a random backoff value when performing the single user transmission, and performs backoff control with a second candidate for the random backoff value when performing the multi user transmission;

the circuitry acquires information regarding the random backoff value used by the circuitry to perform the random backoff control during the multi user transmission; and the backoff control includes:

changing a contention window (CW) based on the random backoff value;

generating an additional backoff value by choosing a number randomly within a range of the CW;

detecting that a channel is not busy; and decrementing the additional backoff value.

2. The wireless terminal station apparatus according to claim 1, wherein the circuitry receives a signal for starting the random backoff control during the multi user transmission.

* * * * *